US012724815B2

(12) United States Patent
Nataraj et al.

(10) Patent No.: US 12,724,815 B2
(45) Date of Patent: Sep. 1, 2026

(54) ENHANCED CONTEXT AWARE CONTENT RETRIEVAL USING LOGICAL MODELING

(71) Applicant: Dell Products L.P., Round Rock, TX (US)

(72) Inventors: Sushma Nataraj, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/014,184

(22) Filed: Jan. 8, 2025

(65) Prior Publication Data

US 2026/0195365 A1 Jul. 9, 2026

(51) Int. Cl.
*G06F 16/353* (2025.01)
*G06F 16/332* (2025.01)
*G06F 16/334* (2025.01)

(52) U.S. Cl.
CPC ........ *G06F 16/353* (2019.01); *G06F 16/3325* (2019.01); *G06F 16/334* (2019.01)

(58) Field of Classification Search
None
See application file for complete search history.

(56) References Cited

U.S. PATENT DOCUMENTS 10,095,986 B2* 10/2018 Burke ..................... G06F 16/93
10,831,834 B2* 11/2020 Zheng ................... G06F 40/258
11,031,003 B2* 6/2021 Asi ......................... G06F 40/20
11,087,089 B2* 8/2021 Zheng ................... G06F 40/166
11,386,685 B2* 7/2022 Kaynig-Fittkau .... G06V 30/414
12,417,352 B1* 9/2025 Murthy ................... G06F 40/30
2024/0289356 A1* 8/2024 Fox ....................... G06F 16/287
2025/0245256 A1* 7/2025 Orellana ................. G06F 16/35
2025/0307749 A1* 10/2025 Shah ................ G06Q 10/06315

OTHER PUBLICATIONS

"Retrieval-augmented generation" Wikipedia. [https://en.wikipedia.org/wiki/Retrieval-augmented_generation#:~:text=Retrieval%2Daugmented%20generation%20(RAG),lawyers%20citing%20nonexistent%20legal%20cases] retrieved Aug. 11, 2025, 8 pages.
"What is Retrieval-Augmented Generation?" Amazon Web Services. [https://aws.amazon.com/what-is/retrieval-augmented-generation/#:~:text=Retrieval%2DAugmented%20Generation%20(RAG)%20is%20the%20process%20of,training%20data%20sources%20before%20generating%20a%20response.&text=With%20RAG%2C%20an%20information%20retrieval%20component%20is,pull%20information%20from%20a%20new%20data%20source] retrieved Aug. 11, 2025, 5 pages.

* cited by examiner

*Primary Examiner* — Debbie M Le
(74) *Attorney, Agent, or Firm* — Amin, Turocy & Watson, LLP

(57) ABSTRACT

Context aware content retrieval can be performed and enhanced. Document manager (DM) can determine respective full, summary, and/or partial versions of respective electronic documents, and respective VI scores and respective token sizes associated therewith, based on analysis of the documents and initial queries. In connection with a received query, from the group of respective versions of respective electronic documents, DM can determine a group of respective candidate versions of respective electronic documents based on respective VI scores and token sizes, first VI score criterion, and first threshold token size. From the candidate group, DM can determine a subgroup of respective versions of respective electronic documents based on respective VI scores and token sizes, second VI score criterion, and second threshold token size that can correspond to a maximum token size limit that can be input into an AI-based model. Updates can be performed based on feedback information.

20 Claims, 10 Drawing Sheets

$E_i'$ 302

$E_i$ 304

$E_{i1}''$ 306

$E_{i2}''$ 308

$VI_i$ 310, $s_i$ 312

$VI_i'$ 314, $s_i'$ 316

$VI_{i1}''$ 318, $s_{i1}''$ 320

$VI_{i2}''$ 322, $s_{i2}''$ 324

600

602

WITH REGARD TO A GROUP OF RESPECTIVE VERSIONS OF RESPECTIVE ELECTRONIC DOCUMENTS, DETERMINING RESPECTIVE VI SCORES ASSOCIATED WITH THE RESPECTIVE VERSIONS OF RESPECTIVE ELECTRONIC DOCUMENTS BASED AT LEAST IN PART ON A RESULT OF A FIRST ANALYSIS OF THE RESPECTIVE VERSIONS OF RESPECTIVE ELECTRONIC DOCUMENTS, WHEREIN THE GROUP OF RESPECTIVE VERSIONS OF RESPECTIVE ELECTRONIC DOCUMENTS CAN COMPRISE RESPECTIVE FIRST VERSIONS OF RESPECTIVE ELECTRONIC DOCUMENTS AND RESPECTIVE SECOND VERSIONS OF RESPECTIVE ELECTRONIC DOCUMENTS THAT CAN BE VARIATIONS OF THE RESPECTIVE FIRST VERSIONS OF RESPECTIVE ELECTRONIC DOCUMENTS

604

IN CONNECTION WITH A QUERY, AND FROM THE GROUP OF RESPECTIVE VERSIONS OF RESPECTIVE ELECTRONIC DOCUMENTS, DETERMINING A SUBGROUP OF RESPECTIVE VERSIONS OF RESPECTIVE ELECTRONIC DOCUMENTS TO INPUT TO AN AI-BASED MODEL FOR A SECOND ANALYSIS BASED AT LEAST IN PART ON A THRESHOLD TOKEN SIZE ASSOCIATED WITH THE AI-BASED MODEL AND THE RESPECTIVE VI SCORES AND RESPECTIVE TOKEN SIZES ASSOCIATED WITH THE RESPECTIVE VERSIONS OF RESPECTIVE ELECTRONIC DOCUMENTS, WHEREIN THE SUBGROUP OF RESPECTIVE VERSIONS OF RESPECTIVE ELECTRONIC DOCUMENTS CAN BE INPUT INTO THE AI-BASED MODEL FOR THE SECOND ANALYSIS TO FACILITATE DETERMINING A RESPONSE TO THE QUERY

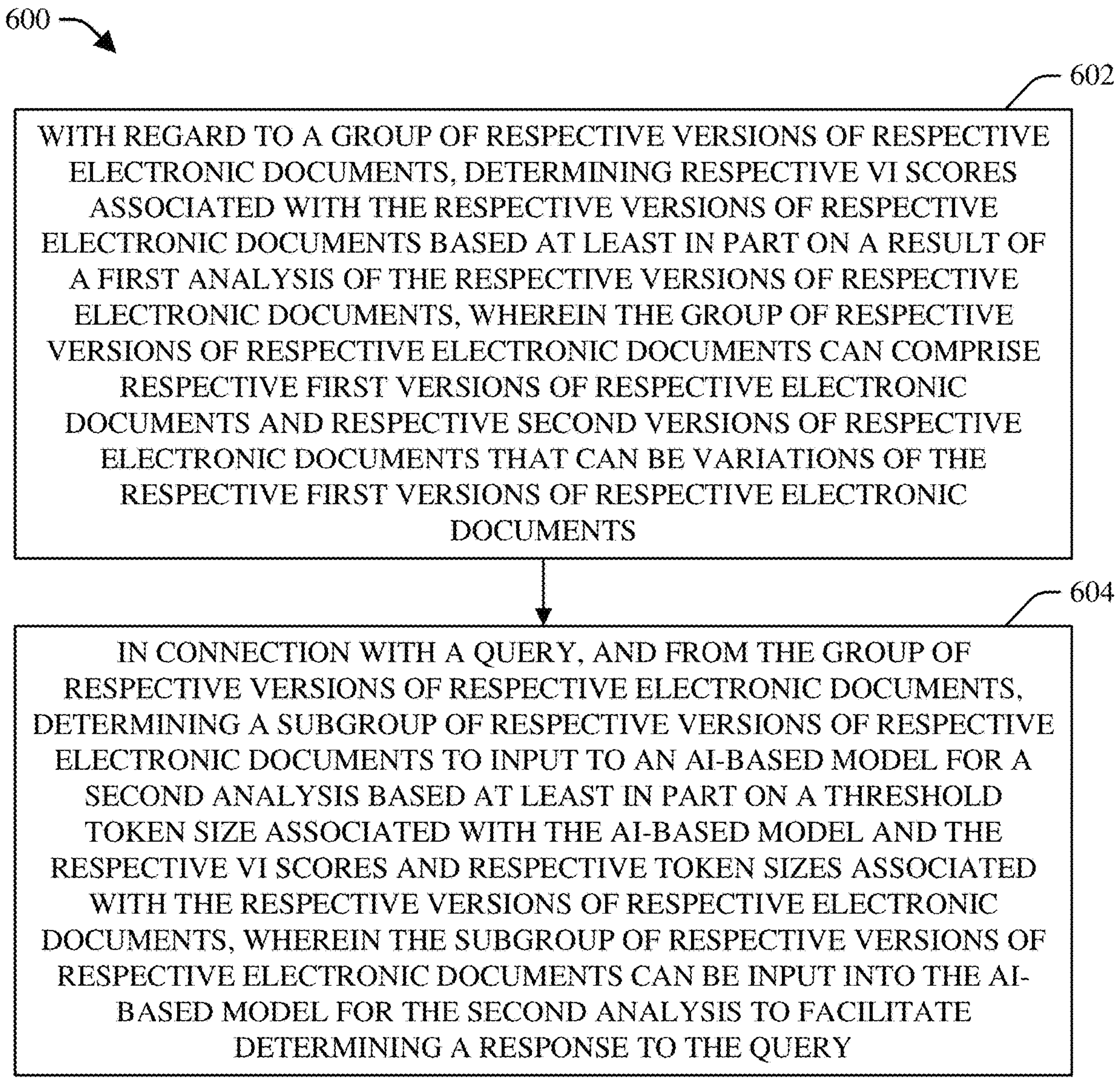

ANALYZING RESPECTIVE ELECTRONIC DOCUMENTS — 702

GENERATING AND/OR RECEIVING A GROUP OF INITIAL QUERIES RELATING TO THE ELECTRONIC DOCUMENTS BASED AT LEAST IN PART ON THE RESULTS OF THE ANALYSIS OF THE RESPECTIVE ELECTRONIC DOCUMENTS, WHEREIN THE INITIAL QUERIES CAN BE QUERIES THAT HAVE BEEN DETERMINED TO BE EXPECTED OR POTENTIAL QUERIES THAT MAY BE ASKED BY USERS — 704

BASED AT LEAST IN PART ON THE ANALYSIS RESULTS AND/OR THE GROUP OF INITIAL QUERIES, GENERATING RESPECTIVE FULL VERSIONS OF RESPECTIVE ELECTRONIC DOCUMENTS, RESPECTIVE PARTIAL VERSIONS OF RESPECTIVE ELECTRONIC DOCUMENTS, AND/OR RESPECTIVE SUMMARY VERSIONS OF RESPECTIVE ELECTRONIC DOCUMENTS — 706

DETERMINING RESPECTIVE VI SCORES AND RESPECTIVE TOKEN SIZES ASSOCIATED WITH THE RESPECTIVE FULL VERSIONS, RESPECTIVE PARTIAL VERSIONS, AND/OR RESPECTIVE SUMMARY VERSIONS OF THE RESPECTIVE ELECTRONIC DOCUMENTS BASED AT LEAST IN PART ON THE RESULTS OF ANALYZING THE RESPECTIVE FULL VERSIONS, RESPECTIVE PARTIAL VERSIONS, AND/OR RESPECTIVE SUMMARY VERSIONS OF RESPECTIVE ELECTRONIC DOCUMENTS — 708

DETERMINING RESPECTIVE TOKEN SIZES ASSOCIATED WITH THE RESPECTIVE FULL VERSIONS, RESPECTIVE PARTIAL VERSIONS, AND/OR RESPECTIVE SUMMARY VERSIONS OF THE RESPECTIVE ELECTRONIC DOCUMENTS (E.G., IN RELATION TO THE RESPECTIVE INITIAL QUERIES) BASED AT LEAST IN PART ON THE RESULTS OF ANALYZING THE RESPECTIVE FULL VERSIONS, RESPECTIVE PARTIAL VERSIONS, AND/OR RESPECTIVE SUMMARY VERSIONS OF RESPECTIVE ELECTRONIC DOCUMENTS — 710

STORING THE RESPECTIVE FULL VERSIONS, RESPECTIVE PARTIAL VERSIONS, AND/OR RESPECTIVE SUMMARY VERSIONS OF RESPECTIVE ELECTRONIC DOCUMENTS, AND THE RESPECTIVE VI SCORES AND RESPECTIVE TOKEN SIZES ASSOCIATED THEREWITH, IN THE DATABASE — 712

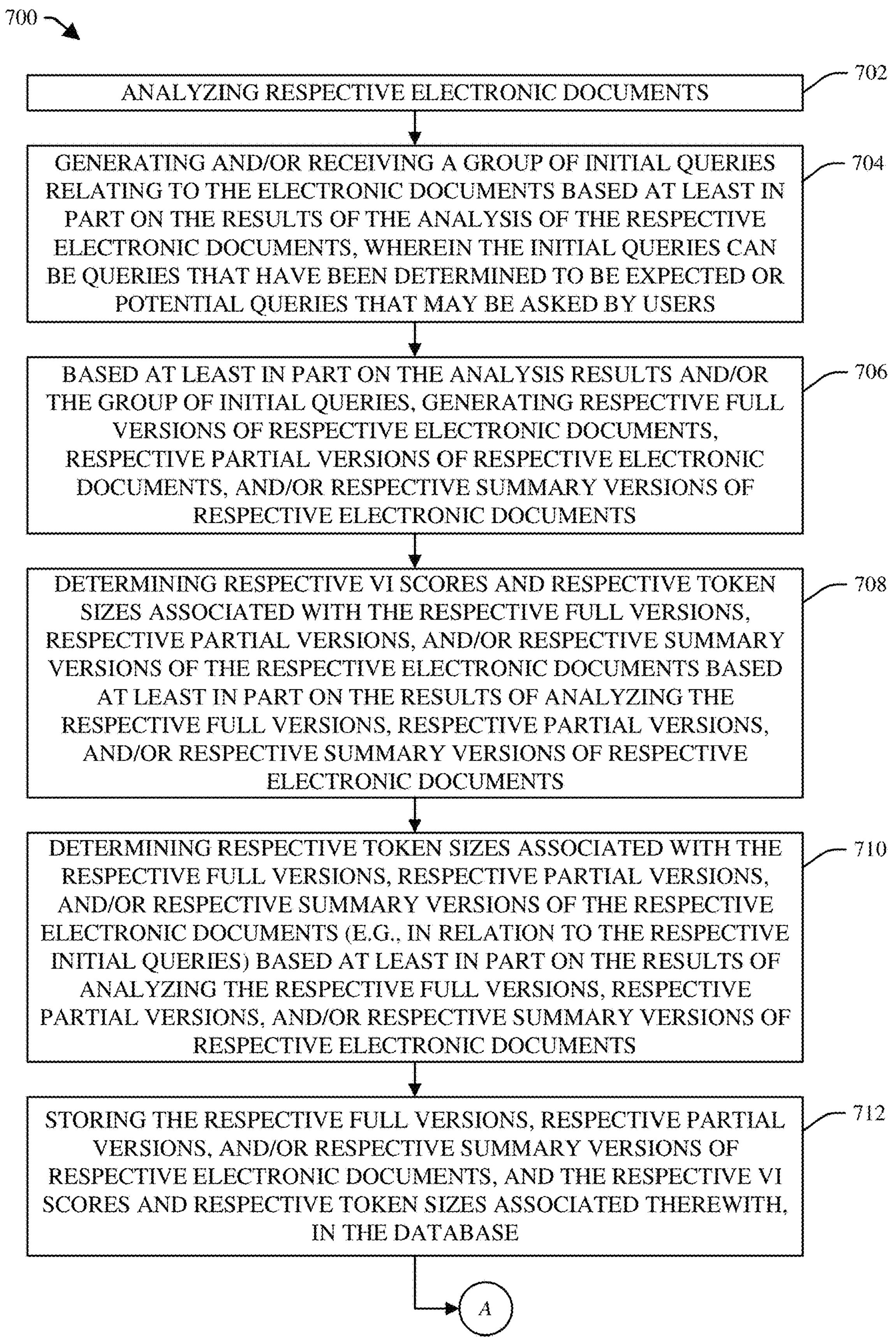

FIG. 7

BASED AT LEAST IN PART ON THE RESULTS OF ANALYZING THE RESPECTIVE VI SCORES AND THE RESPECTIVE TOKEN SIZES, AND THE TOKEN SIZE OF THE QUERY, AND FROM THE RESPECTIVE VERSIONS OF RESPECTIVE ELECTRONIC DOCUMENTS, DETERMINING A GROUP OF RESPECTIVE CANDIDATE VERSIONS OF RESPECTIVE ELECTRONIC DOCUMENTS THAT CAN SATISFY A FIRST DEFINED THRESHOLD TOKEN SIZE AND A FIRST DEFINED VI SCORE CRITERION, WHEREIN THE GROUP OF RESPECTIVE CANDIDATE VERSIONS OF RESPECTIVE ELECTRONIC DOCUMENTS CAN COMPRISE ONE OR MORE OF THE RESPECTIVE FULL VERSIONS, RESPECTIVE PARTIAL VERSIONS, AND/OR RESPECTIVE SUMMARY VERSIONS OF RESPECTIVE ELECTRONIC DOCUMENTS

808

FROM THE GROUP OF RESPECTIVE CANDIDATE VERSIONS OF RESPECTIVE ELECTRONIC DOCUMENTS, AND BASED AT LEAST IN PART ON THE RESULTS OF ANALYZING THE TOKEN SIZE OF THE QUERY AND THE RESPECTIVE VI SCORES AND RESPECTIVE TOKEN SIZES OF THE RESPECTIVE CANDIDATE VERSIONS OF RESPECTIVE ELECTRONIC DOCUMENTS, DETERMINING A SUBGROUP OF RESPECTIVE VERSIONS OF RESPECTIVE ELECTRONIC DOCUMENTS THAT CAN SATISFY THE SECOND DEFINED THRESHOLD TOKEN SIZE AND A SECOND DEFINED VI SCORE CRITERION, WHEREIN THE SUBGROUP OF RESPECTIVE VERSIONS OF RESPECTIVE ELECTRONIC DOCUMENTS CAN BE SELECTED FOR INPUT INTO THE AI-BASED MODEL FOR ANALYSIS IN CONNECTION WITH THE QUERY

810

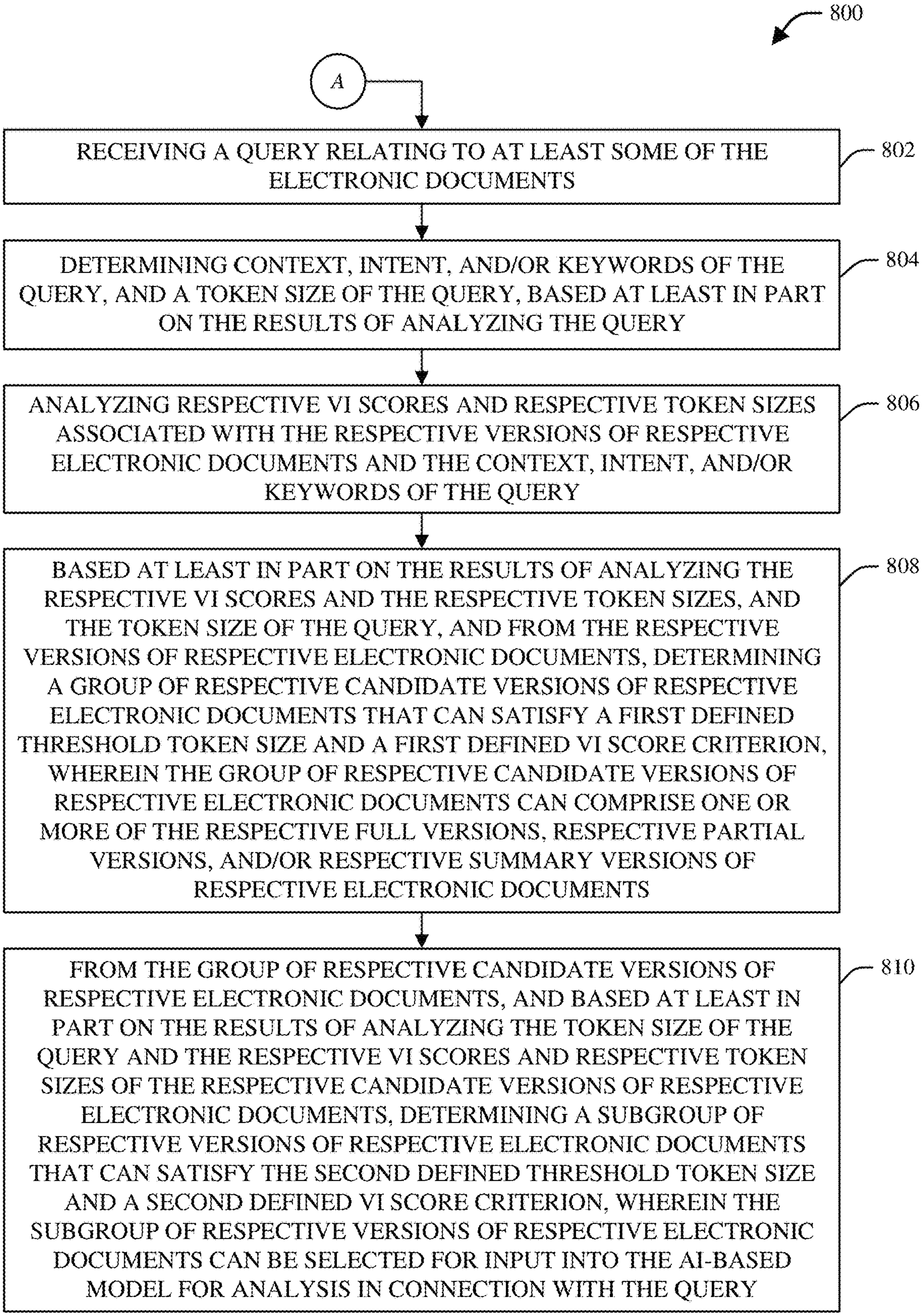

FIG. 8

ENHANCED CONTEXT AWARE CONTENT RETRIEVAL USING LOGICAL MODELING

BACKGROUND

Artificial intelligence (AI)-based models can be utilized to analyze and process queries, such as natural language queries or other types of queries (e.g., from users or devices), and determine responses to those queries from an analysis of electronic documents comprising various types of content, wherein a response to a query can be provided to the entity that submitted the query. For instance, content of electronic documents can be embedded or vectorized to facilitate searching for responses to queries. In response to a query, an AI-based model can search the embedded or vectorized content of the electronic documents to determine and retrieve content from the electronic documents that can be responsive to the query, and can provide a query response comprising the retrieved content.

The above-described description is merely intended to provide a contextual overview regarding AI-based models and query processing, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise: with regard to a group of respective versions of respective electronic documents, determining, by a system comprising at least one processor, respective value information scores associated with the respective versions of respective electronic documents based on a result of a first analysis of the respective versions of respective electronic documents, wherein the group of respective versions of respective electronic documents can comprise respective first versions of respective electronic documents and respective second versions of respective electronic documents that can be variations of the respective first versions of respective electronic documents. The method also can comprise: in connection with a query, and from the group of respective versions of respective electronic documents, determining, by the system, a subgroup of respective versions of respective electronic documents to input to an artificial intelligence-based model for a second analysis based on a threshold token size associated with the artificial intelligence-based model and the respective value information scores and respective token sizes associated with the respective versions of respective electronic documents, wherein the subgroup of respective versions of respective electronic documents can be input into the artificial intelligence-based model for the second analysis to facilitate determining a response to the query.

In certain embodiments, the disclosed subject matter can comprise a system that can comprise at least one memory that can store computer executable components, and at least one processor that can execute computer executable components stored in the at least one memory. The computer executable components can comprise a value information determinator that, with regard to a group of respective forms of respective electronic documents, can determine respective value information scores associated with the respective forms of respective electronic documents based on a result of a first analysis of the respective forms of respective electronic documents, wherein the group of respective forms of respective electronic documents can comprise respective first forms of respective electronic documents and respective second forms of respective electronic documents that can be derived from the respective first forms of respective electronic documents. The computer executable components also can comprise a document selector, wherein, in response to receiving a query, and from the group of respective forms of respective electronic documents, the document selector can determine a portion of the respective forms of respective electronic documents to input to an artificial intelligence-based model for a second analysis based on a threshold token size associated with the artificial intelligence-based model and the respective value information scores and respective token sizes associated with the respective forms of respective electronic documents, wherein the portion of the respective forms of respective electronic documents can be input into the artificial intelligence-based model for the second analysis to facilitate a determination of a response to the query.

In still other embodiments, the disclosed subject matter can comprise a non-transitory machine-readable medium, comprising executable instructions that, when executed by at least one processor, can facilitate performance of operations. The operations can comprise: with regard to a group of respective versions of respective electronic documents, generating respective value scores associated with the respective versions of respective electronic documents of the group based on a result of a first analysis of the respective versions of respective electronic documents, wherein the group of respective versions of respective electronic documents can comprise respective first versions of respective electronic documents and respective second versions of respective electronic documents that can be derived based on the respective first versions of respective electronic documents. The operations further can comprise: in response to receiving a query, and from the group of respective versions of respective electronic documents, selecting a subgroup of respective versions of respective electronic documents for a second analysis using an artificial intelligence-based model based on a threshold token size associated with the artificial intelligence-based model and based on the respective value scores and respective token sizes associated with the respective versions of respective electronic documents, wherein the subgroup of respective versions of respective electronic documents can be input into the artificial intelligence-based model for the second analysis to facilitate generation of a response to the query.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

BRIEF DESCRIPTION OF THE DRAWINGS

FIG. 6 illustrates a flow chart of an example method that can desirably perform context aware content retrieval using VI scores to determine respective versions of respective electronic documents to input into the AI-based model for analysis in connection with a query, in accordance with various aspects and embodiments of the disclosed subject matter.

FIG. 7 depicts a flow chart of an example method that can desirably determine respective full versions, respective partial versions, and/or respective summary versions of respective electronic documents, and respective VI scores and respective token sizes associated therewith, to facilitate managing and performing context aware content retrieval to facilitate determining content to input into the AI-based model for analysis in connection with a query, in accordance with various aspects and embodiments of the disclosed subject matter.

FIG. 8 depicts a flow chart of an example method that can desirably manage and perform context aware content retrieval to facilitate determining certain content to input into the AI-based model for analysis in connection with a query, in accordance with various aspects and embodiments of the disclosed subject matter.

DETAILED DESCRIPTION

Figure 1:
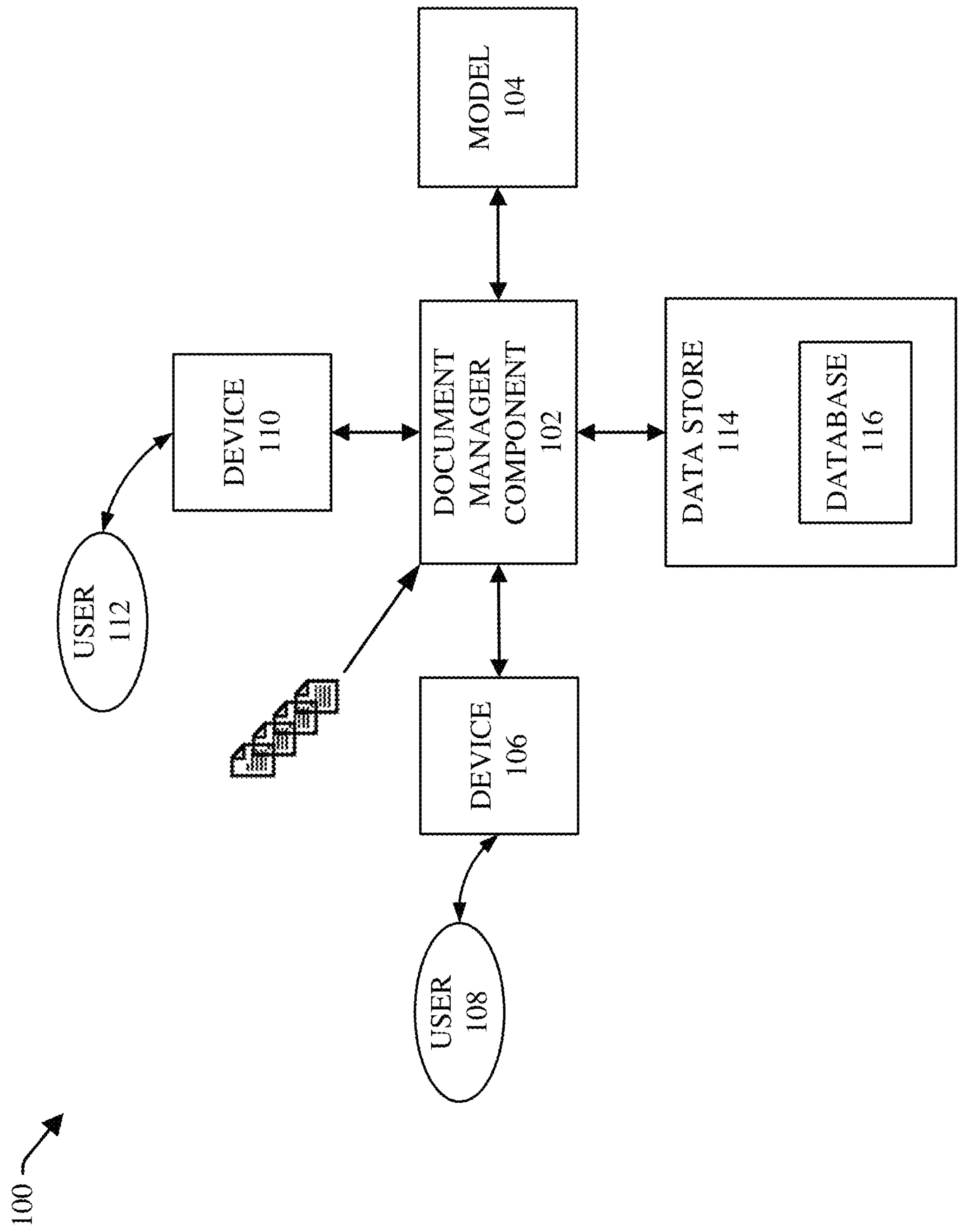
FIG. 1 illustrates a block diagram of a non-limiting example system that can desirably manage and perform context aware content retrieval using logical modeling, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to systems, methods, and techniques that can desirably (e.g., automatically, suitably, efficiently, reliably, enhancedly, and/or optimally) retrieve context aware content from electronic documents using logical modeling. Artificial intelligence (AI)-based models can be utilized to analyze and process queries, such as natural language queries or other types of queries (e.g., from users or devices), and determine responses to those queries from an analysis of electronic documents comprising various types of content, wherein a response to a query can be provided to the entity that submitted the query. For instance, content of electronic documents can be embedded or vectorized to facilitate searching for responses to queries. In response to a query, an AI-based model can search the embedded or vectorized content of the electronic documents to determine and retrieve content from the electronic documents that can be responsive to the query, and can provide a query response comprising the retrieved content.

Entities (e.g., organizations, businesses, and users) are increasingly embracing the possibilities that may be offered by generative AI, and utilizing generative AI. Some existing techniques, such as retrieval augmented generation (RAG), can embed or vectorize content of electronic documents to facilitate providing a pathway for adopting generative AI within specific domains and industries. These existing techniques (e.g., RAG) can enable a language model (LM) to process similarity searches and find answers to natural language queries within the electronic documents. An entity can embed its publicly accessible information documents (e.g., documents relating to products, solutions, entity vision, or other topic), and users (e.g., customers, affiliated entities, employees, or other users) can submit queries to the LM to ask for information contained in such documents.

Significant challenges relating to the data volume that can be embedded alongside queries (e.g., user and/or customer queries) can be encountered by an organization, user, or other entity. For instance, certain AI-based models (e.g., Mistral small model) can support an input token limit (e.g., maximum input token limit) of 32 thousand (K) tokens, certain other AI-based models (e.g., Llama 7B model) can support an input token limit of 8K tokens, and still other AI-based models (e.g., generative pre-trained transformer 4.0 (GPT-4.0) model) can support an input token limit of 128K tokens. When using an existing RAG technique, electronic documents can be stored in a vector format (e.g., embeddings) in a database. When a user submits a query, the existing system, employing the existing RAG technique, can retrieve the vectorized documents and can pass the vectorized documents (e.g., vectorized content) along with the user query as input to the AI-based model (e.g., large LM (LLM)). The AI-based model can vectorize the user query, can perform a semantic search (e.g., a similarity or Euclidean distance search) on the vectorized documents to find data "near" to the query tokens representative of the query, and can generate a query response based on the data (e.g., words) retrieved from the vectorized documents. However, significant challenges, problems, and/or deficiencies can arise with existing techniques, such as the RAG technique, for example, if the combined token size of the query and vectorized content of the vectorized documents exceed the maximum input token limit of the AI-based model. For instance, if the token size of the embeddings (e.g., the query tokens and the tokens of the vectorized content) exceed the maximum input token limit of the AI-based model, the AI-based model may not be able to handle the data input, or at least may not be able to handle all of the data input. In some instances, if the AI-based model is not able to handle the data input due to the data input exceeding the maximum input token limit, an error can result (e.g., the AI-based model can generate or indicate an error). In certain other instances, when the existing RAG technique is employed, if the AI-based model is not able to handle all of the data input due to the data input exceeding the maximum input token limit, the AI-based model or the system can discard (e.g., randomly discard) some of the vectorized documents (e.g., to reduce the token size of the query tokens and vectorized documents such that the token size does not exceed the maximum input token limit), which may result in loss of context and/or loss of content for the AI-based model to consider and/or analyze, and this may result in the AI-based model generating an incorrect (e.g., wrong), incomplete, inferior, and/or otherwise substandard response to the query. Existing RAG techniques do not perform any optimization of the electronic documents that are to be input to the AI-based model.

The disclosed subject matter can address and overcome the aforementioned deficiencies and other deficiencies of the existing systems and techniques. To that end, techniques that can desirably (e.g., automatically, dynamically, suitably, reliably, efficiently, enhancedly, and/or optimally) manage and perform context aware content retrieval using logical modeling, including managing and determining content of electronic documents that can relate to a query and can be input (e.g., in token form), along with the query (e.g., in token form), to an AI-based model for analysis by the AI-based model to enhance (e.g., improve) the response to the query by the AI-based model in electronic document embeddings, including relatively larger electronic document embeddings. In accordance with various embodiments, a system can comprise a document manager component that can desirably manage and determine the content of electronic documents that can desirably manage and perform such enhanced context aware content retrieval using logical modeling. The document manager component can employ logical modeling techniques (e.g., knapsack technique, linear programming (LP) relaxation technique, branch-and-bound technique, or other logical modeling technique) and meta tagging of electronic documents to enhance (e.g., improve or optimize) the electronic document content that can be passed, along with a query, as input (e.g., in tokenized form) to the AI-based model for analysis by the AI-based model to enhance determination of a response to the query by the AI-based model (e.g., in larger electronic document embeddings).

In some embodiments, the document manager component can analyze a group of respective electronic documents. Based at least in part on the results of such analysis, the document manager component can vectorize or embed the respective content of the respective electronic documents of the group of respective electronic documents. Also, based at least in part on such analysis results, the document manager component, employing a query generator component, can determine and generate initial queries that can relate to the respective content of the respective electronic documents. The respective initial (e.g., potential, anticipated, and/or pre-created) queries can have respective contexts, intents, and/or keywords that can relate to the respective content of the respective electronic documents. In certain embodiments, additionally or alternatively, the document manager component can receive user-created initial queries from a user(s) (e.g., from a subject matter expert (SME) or other user, via a device or interface), wherein the user-created (e.g., pre-created) initial queries can have respective contexts, intents, and/or keywords that can relate to the respective content of the respective electronic documents. For instance, the user (e.g., an SME with knowledge relating to the electronic documents and/or the topics or fields associated with the electronic documents) can analyze the electronic documents, and can determine the user-created initial queries based at least in part on the results of such analysis.

The document manager component, employing a document processor component, can determine and generate respective full versions of respective electronic documents, respective partial versions of respective electronic documents, and/or respective summary versions of respective electronic documents based at least in part on the results of analyzing the respective electronic documents and/or the respective initial queries. The document manager component can store the respective full versions, respective partial versions, and/or respective summary versions of respective electronic documents (e.g., in vectorized or embedded format) in a database in a data store.

The document manager component, employing a value information (VI) score determinator component, can determine (e.g., calculate) respective VI scores associated with the respective full versions, respective partial versions, and/or respective summary versions of respective electronic documents in relation to the respective initial queries based at least in part on the results of analyzing the respective full versions, respective partial versions, and/or respective summary versions of respective electronic documents, and/or the respective contexts, intents, and/or keywords of the respective initial queries. The document manager component, employing a token size determinator component, can determine (e.g., identify or measure) respective token sizes associated with the respective full versions, respective partial versions, and/or respective summary versions of respective electronic documents, based at least in part on the results of analyzing the respective full versions, respective partial versions, and/or respective summary versions of respective electronic documents (e.g., the respective tokens that can be representative of the respective full versions, respective partial versions, and/or respective summary versions of respective electronic documents). The document manager component can associate (e.g., attach, link, map, or otherwise associate) the respective VI scores and the respective token sizes (e.g., as metadata or meta tags) with or to the respective full versions, respective partial versions, and/or respective summary versions of respective electronic documents. The document manager component can store the respective VI scores and the respective token sizes along with the respective full versions, respective partial versions, and/or respective summary versions of respective electronic documents in the database in the data store.

In some embodiments, when a query is received (e.g., subsequently received) from a user or device, the document manager component can employ a document selector component that can determine and select a desirable (e.g., suitable, enhanced, or optimal) subgroup of respective versions of respective electronic documents from the group of respective versions of respective electronic documents stored in the database based at least in part on the results of analyzing the query, and the respective VI scores and respective token sizes associated with the respective versions of respective electronic documents, in accordance with defined document management criteria, wherein the respective versions of respective electronic documents can comprise one or more of the respective full versions, respective partial versions, and/or respective summary versions of respective electronic documents. In accordance with various embodiments, the document selector component can employ one or more logical modeling techniques (e.g., knapsack technique, LP relaxation technique, branch-and-bound technique, or other logical modeling technique) and the respective meta tagging (e.g., respective VI scores and respective token sizes) of the respective versions of respective electronic documents to facilitate determining the desirable subgroup of respective versions of respective electronic documents from the group of respective versions of respective electronic documents, such as described herein. For instance, in determining the desirable subgroup of respective versions of respective electronic documents, the document selector component can determine respective versions of respective electronic documents that can have a highest (e.g., maximized or greatest) total VI score, while also having a total token size (that also can include the token size of the query) that can satisfy a defined threshold token size associated with the AI-based model (e.g., a maximum token size that can be input to the AI-based model), as compared to other total VI scores associated with other subgroups of respective versions of respective electronic documents that can satisfy the defined threshold token size, in accordance with defined document management criteria.

The document manager component can input the query and the desirable subgroup of respective versions of respective electronic documents (e.g., input the tokens that can be representative thereof) into the AI-based model. The AI-based model can perform an AI-based analysis on the query and the desirable subgroup of respective versions of respective electronic documents. Based at least in part on the results of such analysis, the AI-based model can determine and generate a response, comprising response information, that can be responsive to the query. The document manager component or the AI-based model can provide (e.g., communicate, display, or present) the query response to the user and/or device. The user and/or device can review and/or evaluate the query response and can provide feedback information to the document manager component, wherein the feedback information can indicate, for example, whether the query response was suitably or sufficiently responsive to the query, whether there were any problems with the query response, whether there was anything missing from the query response, or any suggestions that can improve the query response. In certain embodiments, additionally or alternatively, another user (e.g., SME or other user) or device can review and/or evaluate the query response and can provide feedback information regarding the query response.

The document manager component can receive the feedback information from the user(s) and/or device(s). The document manager component, employing an update component, can analyze the feedback information, the query response, the VI score(s) and/or token size(s) associated with the desirable subgroup of respective versions of respective electronic documents, and/or other information. Based at least in part on the results of such analysis, the update component can determine an update, comprising update information, relating to a query(ies), VI score(s), and/or version(s) of electronic document(s) (e.g., modify a partial version, summary version, or full version of an electronic document, modify a VI score associated with a partial version, summary version, or full version of an electronic document, determine a VI score for a modified partial version, summary version, or full version of an electronic document, modify an initial query, or perform another type of update). The update component can perform or facilitate performing the update relating to the query(ies), VI score(s), and/or version(s) of electronic document(s).

The disclosed subject matter, by employing the document generation manager component and associated models, and the enhanced techniques described herein, can desirably enhance (e.g., improve accuracy and/or relevance of, and/or improve or increase flexibility of) content retrieval (e.g., context aware content retrieval) using logical modeling in connection with queries; enhance analysis of content by an AI-based model in connection with a query; enhance responses (e.g., improve accuracy and/or contextual relevance of responses) to queries (e.g., particularly in larger document embeddings) based at least in part on the enhanced content retrieval; enhance adaptation of versions of electronic documents, VI scoring of versions of electronic documents, content retrieval in connection with queries using an adaptive feedback mechanism to ensure that the content retrieval process and query response process remains agile and responsive to queries as such queries may evolve over time, and query processing and responses improve over time; enhance performance (e.g., improve accuracy and/or relevance) of the query and document management system; enhance training and performance (e.g., enhance inferences, determinations, and/or probability determinations) of AI-based models; enhance (e.g., improve or increase) computational efficiency in content retrieval and query processing, as well as ensuring a desirable balance between a desirable (e.g., suitable, enhanced, or optimal) information value and computational efficiency; reduce (e.g., decrease or minimize) the amount of time, amount of resources, complexity, and costs (e.g., financial costs or other type of cost) associated with processing of queries, content retrieval in connection queries, and/or analysis of queries and content associated therewith; and enhance or increase efficiency in resource usage associated with query processing, as compared to existing systems, methods, and techniques for query processing and content retrieval.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, suitably, reliably, efficiently, enhancedly, and/or optimally) manage and perform context aware content retrieval using logical modeling, in accordance with various aspects and embodiments of the disclosed subject matter. In accordance with various embodiments, the system 100 can comprise a document manager component 102 that can desirably manage and perform context aware content retrieval using logical modeling, including managing and determining content of electronic documents that can relate to a query and can be input (e.g., in token form), along with the query (e.g., in token form), to an AI-based model 104 for analysis by the AI-based model 104 to enhance (e.g., improve) the response to the query by the AI-based model 104 in electronic document embeddings, including relatively larger electronic document embeddings. In accordance with various embodiments, the document manager component 102 (e.g., respective components of the document manager component 102) can be part of one or more devices.

In some embodiments, the document manager component 102 can be associated with (e.g., communicatively connected to) a device 106 and/or a user 108 (e.g., associated with or using the device 106), and/or a device 110 and/or a user 112 (e.g., associated with or using the device 110). The user 108 can be, for example, a user, such as a customer or other information requestor, who can submit queries to the document manager component 102 to request or seek information responsive to such queries. In certain embodiments, the device 106 itself can be the entity that is the information requestor, determines and generates the query, and communicates the query to the document manager component 102. That is, the device 106 can communicate queries to the document manager component 102 on behalf of the user 108 and/or on behalf of the device 106 itself. The queries can be natural language queries, structured queries, or a combination of natural language and structured information items.

The user 112 can be, for example, an SME, another user working with an SME, or other entity that can provide at least some initial (e.g., pre-created) queries that can relate to the content contained in a group of electronic documents relating to various topics or subject matter. The initial queries can be the types of queries that can relate to the group of electronic documents and that the user 112 anticipates or expects other users (e.g., user 108) or entities (e.g., device 106) to submit to the document manager component 102 to request information that can be desirably responsive to the queries.

A device can be, for example, a computer, a laptop computer, a server, a data storage system or device, a wireless, mobile, or smart phone, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device.

In accordance with various embodiments, the AI-based model 104 can be or can comprise an AI model, a machine learning (ML) model, a neural network model, transformer-based model, a graph mining model, or other type of AI-based model. The AI-based model 104 can be or can comprise, for example, an LLM, an LM, a GPT-type model, or other type of AI-based model. Depending on the type of model, the AI-based model 104 can support a maximum token size for input (e.g., as a single input) of, for example, 8K, 16K, 32K, 128K, 256K, or other maximum token size that can be greater than or less than 256K.

The document manager component 102 also can be associated with (e.g., communicatively connected to) or can comprise a data store 114 that can store information, such as electronic documents, queries, document management-related information, and/or other desired information. In some embodiments, the data store 114 can comprise a database 116 that can comprise the electronic documents, including respective versions (e.g., full, partial, and/or summary versions) of respective electronic documents, and metadata or meta tagging (e.g., respective VI scores, respective token sizes, and/or other metadata), such as described herein. In certain embodiments, the respective content of the respective versions of respective electronic documents can be in a vectorized and/or embedded format, such as described herein. The database 116 can be, for example, a flexible-embed vault that can be a desirably dynamic storage solution and feature that can have categorized electronic embeddings in full, partial, and summary forms respectively associated with unique VI scores and token sizes for respective queries (e.g., initial or anticipated queries) for those respective versions of respective electronic documents. This can ensure desirable (e.g., suitable, enhanced, or optimal) storage and retrieval of content (e.g., content of respective versions of respective electronic documents) for diverse query types, which can allow for efficient and targeted access to the most contextually relevant information that can be responsive to queries.

Figure 2:
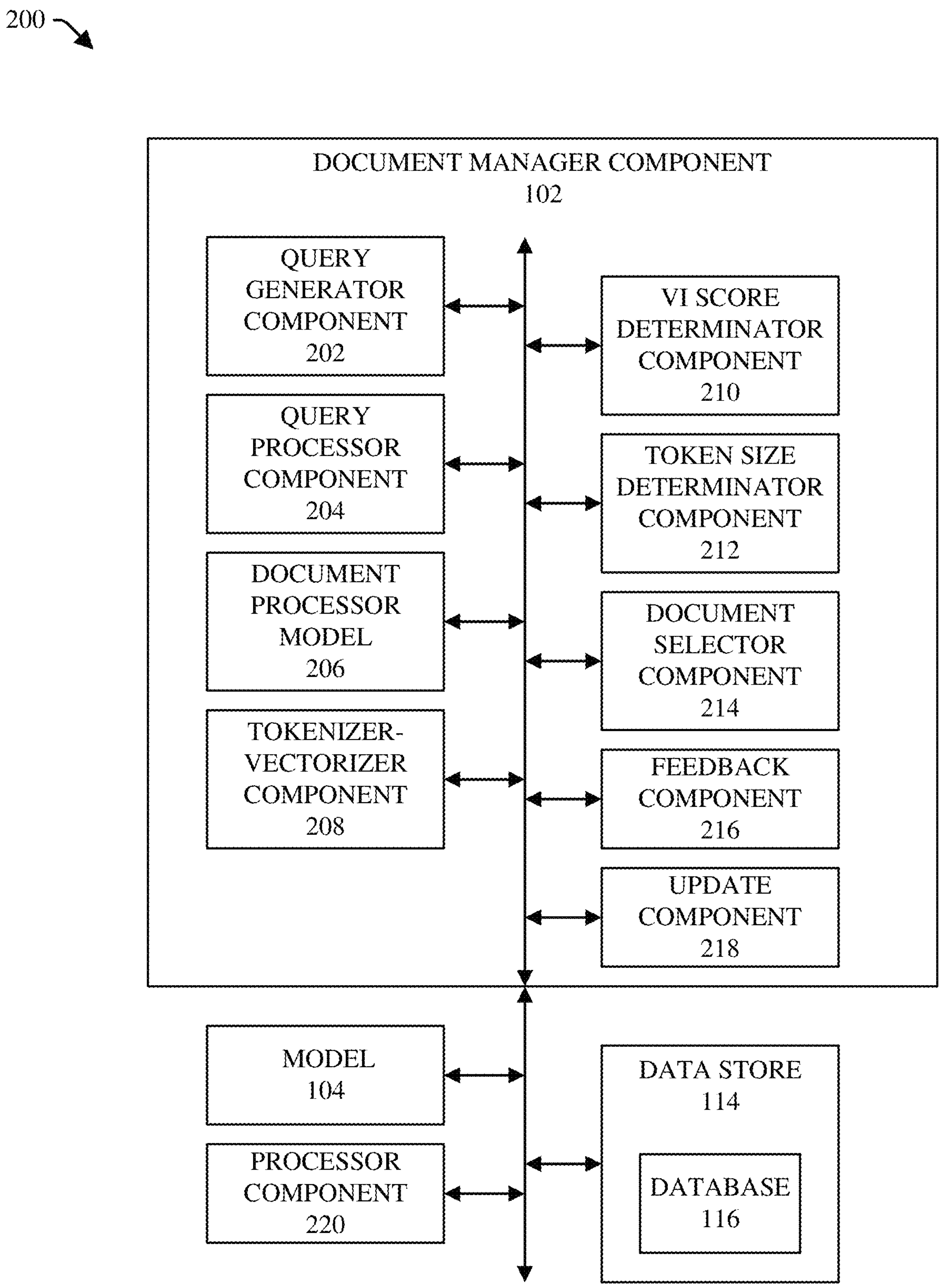
FIG. 2 depicts a block diagram of a system that can comprise a document manager component, an artificial intelligence (AI)-based model, and other components to facilitate desirably managing and performing context aware content retrieval using logical modeling, in accordance with various aspects and embodiments of the disclosed subject matter.

Referring to FIG. 2 (along with FIG. 1), FIG. 2 depicts a block diagram of a system 200 that can comprise the document manager component 102, the AI-based model 104, and other components to facilitate desirably managing and performing context aware content retrieval using logical modeling, in accordance with various aspects and embodiments of the disclosed subject matter. In some embodiments, the system 100 can be part of the system 100 depicted in FIG. 1 and described herein. In accordance with various embodiments, the document manager component 102 can comprise and employ a number of components, including a query generator component 202, a query processor component 204, a document processor component 206, a tokenizer-vectorizer component 208, a VI score determinator component 210, a token size determinator component 212, a document selector component 214, a feedback component 216, and an update component 218. The system 200 also can comprise a processor component 220, the AI-based model 104, and the data store 114, which can comprise the database 116. In accordance with various embodiments, the document manager component 102, the AI-based model 104, the data store 114, and the processor component 220 can be associated with (e.g., communicatively connected to) each other.

In accordance with various embodiments, the document manager component 102 can employ a token-constrained value maximization (TCVM) framework and techniques for determining, generating, and storing respective electronic document embeddings in various forms, including respective full, summary, and/or partial versions of electronic documents, that each can be associated with (e.g., tagged with or mapped to) respective VI scores and respective sizes (e.g., respective token sizes), such as described herein. The TCVM framework and techniques can facilitate (e.g., enable) pre-calculation (e.g., by the document manager component 102) of potential relevance for anticipated queries using desired metrics, such as, for example, ROUGE scores, semantic scores, and/or other desired type of relevance or importance score, such as described herein. By associating each electronic document variation (e.g., full, summary, and/or partial versions of electronic documents) with its VI score and size, the document manager component 102 can desirably (e.g., suitably, efficiently, reliably, enhancedly, or optimally) manage the token constraints (e.g., maximum token size limit for token input) that can be inherent in certain AI-based model operations (e.g., for LLM models or certain other models), which can ensure that only the most desirable (e.g., relevant, valuable, and/or otherwise desirable content) can be utilized during the generation process.

In some embodiments, during the electronic document retrieval process (e.g., in response to a received query), the document manager component 102 (e.g., employing the TCVM framework and techniques) can utilize LP relaxation techniques to identify a desirable (e.g., suitable, usable, enhanced, or optimal) group of respective candidate versions of respective electronic documents by balancing the respective VI scores of the respective versions of respective electronic documents against the token budget (e.g., the token size constraints) of the AI-based model 104, such as described herein. In certain embodiments, the document manager component 102 (e.g., employing the TCVM framework and techniques) can utilize and/or apply the branch-and-bound technique (e.g., branch-and-bound search technique) to further refine the selection of respective versions of respective electronic documents, which can ensure that the included document content (e.g., from the refined group of respective versions of respective electronic documents determined from the group of respective candidate versions of respective electronic documents) can enhance (e.g., maximize or optimize) the overall value information for responding to the particular query, such as described herein. This approach, by the document manager component 102 (e.g., employing the TCVM framework and techniques), not only can enhance (e.g., improve or optimize) the precision and relevance of the retrieve electronic document content, but also can significantly enhance (e.g., improve, reduce, or optimize) the processing time for processing and responding to queries, which can make it a desirably powerful tool for handling complex, token-constrained electronic document retrieval scenarios in AI-based applications.

In some embodiments, the query generator component 202 can be employed to determine and generate at least some initial queries (e.g., potential, anticipated, and/or pre-created queries) relating to the group of electronic documents based at least in part on the results of analyzing the group of electronic documents. The initial queries determined and generated by the query generator component 202 can be, for example, queries that the query generator component 202 has determined satisfy a threshold likelihood or probability (e.g., 50%, 67%, or 75% likelihood or probability, or other likelihood or probability greater or less than 75%) of being provided by users (e.g., user 108) to the system (e.g., system 100 or system 200) in connection with the group of electronic documents. For instance, the query generator component 202 can determine the respective context, intent, and/or keywords of or relating to the respective content of the respective electronic documents based at least in part on the analysis results, and can determine such initial queries based at least in part on the respective context, intent, and/or keywords. The initial queries generated by the query generator component 202 can be in addition to or an alternative to the initial queries provided by the user 112 and/or device 110.

The query processor component 204 can determine a context, intent, and/or keywords of a query based at least in part on the results of analyzing the query and/or other information relating to the query. For instance, with regard to an initial query, the query processor component 204 can determine a context, intent, and/or keywords of the initial query based at least in part on the results of analyzing the initial query and/or other information relating to the initial query (e.g., information relating to or indicating the context, intent, and/or keywords of the initial query that can be received from the query generator component 202, the user 112, or device 110). With regard to a query received from the user 108 or device 106, the query processor component 204 can determine a context, intent, and/or keywords of the query based at least in part on the results of analyzing the query.

The document processor component 206 can determine and generate the respective versions of respective electronic documents of the group of electronic documents based at least in part on the results of analyzing the respective content of the respective electronic documents and/or the respective initial queries (e.g., the respective contexts, respective intents, and/or respective keywords of the respective initial queries). For instance, based at least in part on such analysis results, the document processor component 206 can determine and generate respective full versions, respective partial versions, and/or respective summary versions of the respective electronic documents. A full version of an electronic document can comprise all or at least substantially all of the content of the electronic document, wherein the electronic document can be an entire book, manual, magazine, a brochure, or other type of electronic document, or can be a chapter or section of a book, a manual, a magazine, a brochure, or other type of electronic document, or can comprise all or at least substantially all of a group of web pages, or a subgroup of web pages that can be or can represent a chapter of section of the content contained in the group of web pages. A partial version of an electronic document can comprise a significant (e.g., key or relevant) portion(s) (e.g., section(s)) of the content of the electronic document. A summary version of an electronic document can comprise a summarization of the content (e.g., summarization of significant, key, or relevant content) of the electronic document.

The tokenizer-vectorizer component 208 can tokenize, vectorize, and/or embed or facilitate embedding content of the respective versions of respective electronic documents and/or queries. For instance, the tokenizer-vectorizer component 208 can vectorize and/or tokenize the respective full versions, respective partial versions, and/or respective summary versions of the respective electronic documents, based at least in part on the results of analyzing the respective full versions, respective partial versions, and/or respective summary versions of the respective electronic documents, to generate the respective full versions, respective partial versions, and/or respective summary versions of the respective electronic documents in vectorized and/or tokenized form, for example, using a desired vectorization and/or tokenization process(es), technique(s), and/or algorithm(s). The result can be respective vectorized tokens that can be representative of the respective content of the respective full versions, respective partial versions, and/or respective summary versions of the respective electronic documents (e.g., respective full versions, respective partial versions, and/or respective summary versions of the respective electronic documents). For example, for each full version of an electronic document, the tokenizer-vectorizer component 208 can generate a group (e.g., a sequence or arrangement) of vectorized tokens that can be representative of the full version of the electronic document; for each partial version of an electronic document, the tokenizer-vectorizer component 208 can generate a group of vectorized tokens that can be representative of the partial version of the electronic document; and/or for each summary version of an electronic document, the tokenizer-vectorizer component 208 can generate a group of vectorized tokens that can be representative of the summary version of the electronic document.

The document processor component 206 and/or the tokenizer-vectorizer component 208 can operate to generate embeddings of the respective full versions, respective partial versions, and/or respective summary versions of the respective electronic documents (e.g., the respective groups of vectorized tokens that can be representative thereof) in vectorized and/or tokenized form, for example, using a desired embedding process, technique, and/or algorithm. In accordance with various embodiments, In some embodiments, the document processor component 206 (and/or the tokenizer-vectorizer component 208) can comprise or employ one or more AI-based models to determine or facilitate determining, and/or generate embeddings for, the respective full versions, respective partial versions, and/or respective summary versions of the respective electronic documents. In accordance with various embodiments, the one or more AI-based models (e.g., pre-trained AI-based models) can be a bidirectional encoder representations from transformers (BERT)-type model, a GPT-type model, a bidirectional autoregressive transformer (BART)-type model, a text-to-text transfer transformer (T5)-type model, or other desired type of AI-based model (e.g., other type of encoder-based, decoder-based, and/or transformer-based model, or another type of AI-based model employing another type of AI-based structure, processing, and analysis). In certain other embodiments, additionally or alternatively, the document processor component 206 (and/or the tokenizer-vectorizer component 208) can employ custom embeddings that can be desirably fine-tuned for a desired (e.g., particular) domain.

For instance, for each electronic document di in an electronic document collection, the document processor component 206 (and/or the tokenizer-vectorizer component 208), using the one or more AI-based models or custom embeddings, can determine and generate an embedding (e.g., a full document embedding) for a full version of an electronic document, an embedding (e.g., a summary document embedding) for a summary version of the electronic document, and/or an embedding (e.g., a partial document embedding) for a partial version of the electronic document. With regard to a full document embedding, the document processor component 206 (and/or the tokenizer-vectorizer component 208) can determine and generate an embedding $E_i$ for the full version of the electronic document $d_i$ (e.g., $E_i$=Embed($d_i$)) using a BERT-type model, a GPT-type model, or custom embeddings that can be fine-tuned for the domain.

With regard to the summary document embedding, the document processor component 206 can determine and generate a summary version $$d_i'$$

of the electronic document $$d_i \text{ (e.g., } d_i' = \text{Summarize}(d_i)),$$

for example, using summarization techniques, such as extractive summarization (e.g., TextRank), abstractive summarization (e.g., using a BART model, a T5 model, or other type of AI-based model that can be usable or suitable to perform abstractive summarization), or another desired type of summarization technique. The document processor component 206 (and/or the tokenizer-vectorizer component 208) can determine and generate (e.g., create) an embedding $$E_i'$$

for the summary version $$d_i'$$

of the electronic document $$d_i \text{ (e.g., } E_i' = \text{Embed}(d_i')).$$

With regard to the partial document embedding, the document processor component 206 can determine or identify one or more significant portions of the electronic document for partial inclusion (e.g., for inclusion in the partial version of the electronic document), based at least in part on the results of analyzing the electronic document, using one or more techniques, such as, for example, text segmentation, significance (e.g., importance) ranking, or other desired type of technique. The document processor component 206 can select the significant (e.g., relevant, key, important, or otherwise significant) portion(s) based at least in part on defined document management criteria relating to creating partial versions of electronic documents (e.g., first few paragraphs of the electronic document; most relevant section(s) or portion(s) of the electronic document; a desired number of the more highly relevant section(s) or portion(s) of the electronic document; and/or another portion(s) of the electronic document based on another document management criterion). For each of one or more selected significant portions of the electronic document, the document processor component 206 can generate a partial version $$d_{ij}''$$

to the electronic document $$d_i \left(\text{e.g., } d_{ij}'' = PartialExtract(d_i)\right),$$

wherein j can have a value that denote one particular partial version (e.g., particular partial content that can be a particular significant portion) of one or more partial versions of the electronic document. The document processor component 206 (and/or the tokenizer-vectorizer component 208) can determine and generate an embedding $$E_{ij}''$$

for the partial version $$d_{ij}''$$

of the electronic document $$d_i \left(\text{e.g., } E''_{ij} = \text{Embed}\left(d''_{ij}\right)\right).$$

The VI score determinator component 210 can determine (e.g., calculate or compute) respective VI scores for the respective versions (e.g., respective full versions, respective summary versions, and/or respective partial versions) of respective electronic documents based at least in part on the results of analyzing the respective versions of respective electronic documents and/or the respective initial queries (e.g., the respective contexts, intents, and/or keywords of the respective initial queries), using one or more desired scoring and/or weighting techniques relating to quality, significance, similarity, relevance, semantics, and/or another metric, factor, or characteristic associated with the respective versions of respective electronic documents. A VI score can indicate the quality, significance, similarity, relevance, semantics, and/or other metric, factor, or characteristic associated with particular version of an electronic document. In some embodiments, the VI score determinator component 210 can employ recall-oriented understudy for gisting evaluation (ROUGE) and/or semantic techniques and scoring to determine the respective VI scores for the respective versions of respective electronic documents. In other embodiments, the VI score determinator component 210 can employ one or more other types of techniques and scoring (and/or ROUGE and/or semantic techniques and scoring) to determine the respective VI scores for the respective versions of respective electronic documents.

In some embodiments, if and when ROUGE and semantic techniques and scoring are employed, with regard to each of the respective versions of respective electronic documents, the VI score determinator component 210 can determine the VI score associated with the version of the electronic document based at least in part on the result of analyzing the version of the electronic document and/or a reference version of the electronic document (e.g., reference, original, and/or full version of the electronic document), using the ROUGE and semantic techniques. For instance, the VI score determinator component 210 can determine the ROUGE score $ROUGE_i$ associated with the full version of the electronic document $d_i$ based at least in part on the results of analyzing the full version of the electronic document $d_i$ and the reference version (reference) of the electronic document ($ROUGE_i = ROUGE(d_i, reference)$), using the ROUGE technique, process, or algorithm. The VI score determinator component 210 can determine the ROUGE score $ROUGE_i'$ associated with the summary version of the electronic document $d_i$ based at least in part on the results of analyzing the summary version $$d'_i$$

of the electronic document $d_i$ and the reference version (reference) of the electronic document $$\left(\text{ROUGE}'_i = \text{ROUGE}(d'_i, \text{reference})\right),$$

using the ROUGE technique, process, or algorithm. For each of one or more partial versions of the electronic document, the VI score determinator component 210 can determine the ROUGE score $$\text{ROUGE}''_{ij}$$

associated with the partial version of the electronic document $d_i$ based at least in part on the results of analyzing the partial version $$d''_{ij}$$

of the electronic document $d_i$ and the reference version (reference) of the electronic document $$\left(\text{ROUGE}''_{ij} = \text{ROUGE}\left(d''_{ij}, \text{reference}\right)\right),$$

using the ROUGE technique, process, or algorithm.

With regard to semantic scoring, the VI score determinator component 210 can determine the semantic score using one or more desired techniques, such as, for example, cosine similarity between embeddings of the electronic document and query or other desired (e.g., relevant) texts. For example, the VI score determinator component 210 can determine the semantic score $Semantic_i$ associated with the full version of the electronic document $d_i$ based at least in part on the results of analyzing the embedding Ei of the full version of the electronic document $d_i$ and the query embedding (query_embed) of the query associated with the electronic document ($Semantic_i = CosineSimilarity(E_i, query\_embed)$), using the semantic technique (e.g., cosine similarity technique), process, or algorithm. The query can be an initial query, and the query embedding can be an embedding regarding or relating to the query or the context, intent, and/or keyword(s) of the query. The VI score determinator component 210 can determine the semantic score $$\text{Semantic}'_i$$

associated with the summary version $$d'_i$$

of the electronic document $d_i$ based at least in part on the results of analyzing the embedding $$E'_i$$

of the summary version $$d'_i$$

of the electronic document $d_i$ and the query embedding (query_embed) of the query associated with the electronic document $$(\text{Semantic}'_i = CosineSimilarity(E'_i, \text{query\_embed})),$$

using the semantic technique, process, or algorithm. For each of one or more partial versions of the electronic document, the VI score determinator component 210 can determine the semantic score $$\text{Semantic}''_{ij}$$

associated with the partial version of the electronic document $d_i$ based at least in part on the results of analyzing the embedding $$E''_{ij}$$

of the partial version $$d''_{ij}$$

of the electronic document $d_i$ and the query embedding (query_embed) of the query associated with the electronic document $$\left(\text{Semantic}''_{ij} = CosineSimilarity\left(E''_{ij}, \text{query\_embed}\right)\right).$$

In some embodiments, with regard to each of the respective versions of respective electronic documents, the VI score determinator component 210 can determine (e.g., calculate) the VI score of the particular version of the electronic document as a weighted combination (e.g., summation of weighted values) of two or more scores (e.g., ROUGE score, semantic score, and/or another score(s)), based at least in part on the two or more scores and respective weights associated with (e.g., applied to) the two or more scores. For instance, if ROUGE and semantic scores are employed, with regard to each of the respective versions of respective electronic documents, the VI score determinator component 210 can determine the VI score of the particular version of the electronic document as a weighted combination of the ROUGE score, a first weight (α) applied to the ROUGE score, the semantic score, and a second weight (β) applied to the semantic score. For example, the VI score determinator component 210 can determine the VI score $VI_i$ of a full version of an electronic document as a weighted combination of the ROUGE score $ROUGE_i$, the first weight (α) applied to $ROUGE_i$ (e.g., $ROUGE_i$ multiplied by α), the semantic score $\text{Semantic}_i$, and the second weight (β) applied to the semantic score $\text{Semantic}_i$ ($VI_i = \alpha \cdot ROUGE_i + \beta$. $\text{Semantic}_i$). The VI score determinator component 210 can determine the VI score $$VI'_i$$

of a summary version of the electronic document as a weighted combination of the ROUGE score $$\text{ROUGE}'_i,$$

the first weight (α) applied to $$\text{ROUGE}'_i,$$

the semantic score $$\text{Semantic}'_i,$$

and the second weight (β) applied to the semantic score $$\text{Semantic}'_i(VI'_i = \alpha \cdot \text{ROUGE}'_i + \beta \cdot \text{Semanic}'_i).$$

The VI score determinator component 210 can determine the VI score $$VI''_i$$

of a partial version of the electronic document as a weighted combination of the ROUGE score $$\text{ROUGE}''_i,$$

the first weight (α) applied to $$\text{ROUGE}''_i,$$

the semantic score $$\text{Semantic}''_i,$$

and the second weight (β) applied to the semantic score $$\text{Semantic}''_i(VI''_i = \alpha \cdot \text{ROUGE}''_i + \beta \cdot \text{Semantic}''_i).$$

As disclosed, in accordance with various embodiments, two or more types of scoring can be utilized, wherein respective weights can be applied to the two or more respective scores. In some embodiments, the VI score determinator component 210 can determine a total VI score (e.g., total $VI_i$) of a particular version (e.g., full version, summary version, or partial version) of an electronic document as follows:

$$\text{Total } VI_i = \sum_{k=1}^{m} w_k \cdot VI_i(q_k),$$

wherein w can represent a weight value of respective weight values associated with respective types of scores, $VI_i$ can represent the respective type of score (e.g., ROUGE score, semantic score, or other type of score), q can represent a query of respective queries, i can be the $i^{th}$ value, k can be the $k^{th}$ value, and m can be the total number of different scorings that can be employed. The VI score determinator component 210 can apply respective (e.g., unique or different) weight values, $w_k$, to respective types of scores (e.g., ROUGE score, semantic score, or other type of score) to facilitate giving desired relative weight (e.g., import or significance) to each of the types of scores (e.g., in relation to other type(s) of scores), wherein the total VI score (e.g., total $VI_i$) of the particular version of the electronic document can be comprised of a combination (e.g., a sum or other combination) of respectively weighted scores of respective score types (e.g., ROUGE score, semantic score, and/or other type of score). With further regard to $q_k$, $q_k$ can be or can represent the actual content (e.g., query and content).

In certain embodiments, there can be respective ROUGE scores, respective semantic scores, and/or respective VI scores (and/or respective other type(s) of scores) associated with respective contexts, respective intents, and/or respective keywords of the query. For example, based at least in part on the results of analyzing the particular embedding of the particular version (e.g., full version, summary version, or partial version) of the electronic document and the query embedding of the query associated with the electronic document, the VI score determinator component 210 can determine a first ROUGE score, a first semantic score, and/or a first VI score with respect to a first context, a first intent, and/or a first keyword of the query, a second ROUGE score, a second semantic score, and/or a second VI score with respect to a second context, a second intent, and/or a second keyword of the query, and/or another ROUGE score, another semantic score, and/or another VI score with respect to another context, another intent, and/or another keyword of the query. The VI score determinator component 210 can determine a total (e.g., a combined) VI score for the particular version of the electronic document as the respectively weighted combination of the respective ROUGE scores and/or the respective semantic scores, and/or the respective VI scores, associated with the respective contexts, respective intents, and/or respective keywords of the query.

In some embodiments, the token size determinator component 212 can determine (e.g., calculate, measure, or otherwise determine) and generate respective token sizes (e.g., respective token counts or sizes) of respective tokens (e.g., respective groups of tokens) of respective versions of respective electronic documents, based at least in part on the results of analyzing the respective tokens of respective versions of respective electronic documents. For instance, with regard to each electronic document, the token size determinator component 212 can determine and generate a first token size $s_i$ of the first group of tokens that can be representative of a full version of the electronic document $d_i$ ($s_i$=TokenCount($d_i$)), a second token size $$s_i'$$

of the second group of tokens that can be representative of a summary version $$d_i'$$

of the electronic document $$d_i(s_i' = TokenCount(d_i')),$$

and/or, or each partial version of the electronic document, a third token size $$s_{ij}''$$

of the third group of tokens that can be representative of the partial version $$d_i''$$

electronic document $$d_i\left(s_{ij}'' = TokenCount\left(d_{ij}''\right)\right),$$

based at least in part on the results of analyzing the respective groups of tokens of the respective versions of the electronic document.

Figure 3:
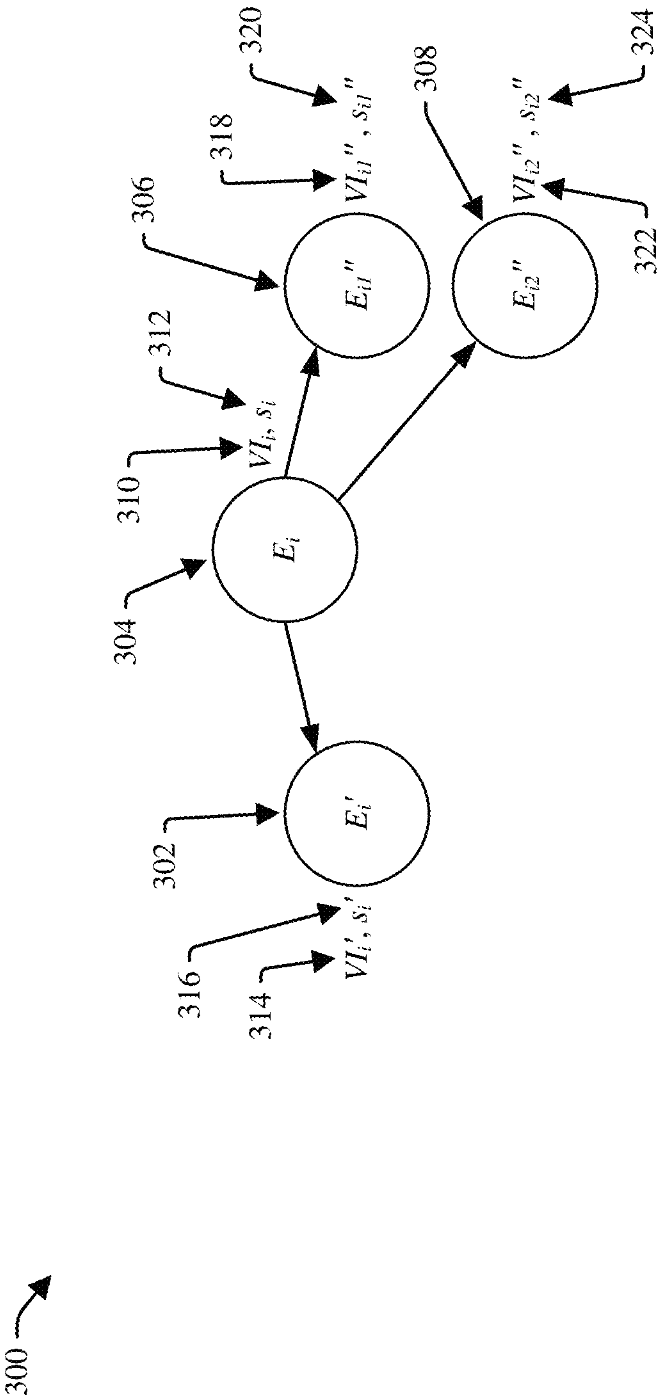
FIG. 3 illustrates a diagram of non-limiting example electronic document embeddings associated with a full version, partial versions, and a summary version of an electronic document and associated respective value information (VI) scores and respective token sizes, in accordance with various aspects and embodiments of the disclosed subject matter.

The document processor component 206 (or another component of the document manager component 102) can store the respective embeddings and associated respective metadata (e.g., respective VI scores, respective token sizes, and/or other desired respective metadata or meta tags) of the respective versions (e.g., respective full versions, respective summary versions, and/or respective partial versions) of respective electronic documents in the database 116 of the data store 114. Referring briefly to FIG. 3 (along with FIGS. 1 and 2), FIG. 3 illustrates a diagram of non-limiting example electronic document embeddings 300 associated with (e.g., representative of) a full version, partial versions, and a summary version of an electronic document and associated respective VI scores and respective token sizes, in accordance with various aspects and embodiments of the disclosed subject matter. The example electronic document embeddings 300 can comprise an embedding 302 ($E_i$) that can be representative of a full version of the electronic document, an embedding 304

$$(E_i')$$

that can be representative of a summary version of the electronic document, and embedding 306 ($E_{i1}''$) and embedding 308 ($E_{i2}''$) that can be representative of respective partial versions (e.g., a first partial version and a second partial version) of the electronic document. The example electronic document embeddings 300 also can comprise a VI score ($VI_i$) 310 and a token size ($s_i$) 312 associated with the embedding 302 ($E_i$), a VI score $$(VI_i')$$

314 and a token size $$(s_i')$$

316 associated with the embedding 304

$$(E_i'),$$

a VI score ($VI_{i1}$") 318 and a token size ($s_{i1}$") 320 associated with the embedding 306 ($E_{i1}$"), and a VI score ($VI_{i2}$") 322 and a token size ($s_{i2}$") 324 associated with embedding 308 ($E_{i2}$").

With the respective embeddings and associated respective metadata of the respective versions of respective electronic documents stored in the database 116 of the data store 114, when a query is received from the user 108 or device 106, the document manager component 102 can determine which (e.g., a portion or subgroup) of the respective versions of respective electronic documents stored in the database 116 of the data store 114 are to be retrieved from the database 116 and provided to the AI-based model 104 for analysis, based at least in part on the results of analyzing the respective metadata associated with the respective versions of respective electronic documents and the query (e.g., the context, intent, and/or keywords of the query), to facilitate determining a response to the query, in accordance with the defined document management criteria.

In response to receiving the query, the query processor component 204 can analyze the query. Based at least in part on the results of analyzing the query, the query processor component 204 can determine or identify the context, intent, and/or keywords of the query. In some embodiments, to facilitate processing and/or analyzing the query, the query processor component 204 and/or the tokenizer-vectorizer component 208 can vectorize and/or tokenize the query information of the query to generate a group of vectorized tokens that can be representative of the query and/or the context, intent, and/or keywords of the query.

In response to the query, the document selector component 214 can determine and select a subgroup (e.g., an enhanced or optimal subgroup) of respective versions of respective electronic documents, based at least in part on the results of analyzing the query (e.g., the context, intent, and/or keywords of the query), the respective versions of respective electronic documents (e.g., the embeddings representative of the respective versions of respective electronic documents), and/or the associated metadata (e.g., respective VI scores and respective token sizes) stored in the database 116, in accordance with the defined document management criteria, which can comprise one or more defined threshold token sizes that can be applied by the document selector component 214. In some embodiments, the document selector component 214 can employ a multi-pronged process (e.g., using the LP relaxation technique, the branch-and-bound technique, and/or another desired technique) to determine the desirable subgroup of respective versions of respective electronic documents. In other embodiments, the document selector component 214 can employ a single-pronged process (e.g., using a desired technique) to determine the desirable subgroup of respective versions of respective electronic documents.

If and when using the multi-pronged process, where the LP relaxation technique and the branch-and-bound technique are employed, the document selector component 214 can initially utilize the LP relaxation technique to determine, from the group of respective versions of respective electronic documents, a group of respective candidate versions of respective electronic documents that can satisfy (e.g., meet) a first defined threshold (e.g., first defined threshold maximum) token size and a first defined VI score criterion, based at least in part on the results of analyzing the query (e.g., the context, intent, and/or keywords of the query), the respective versions of respective electronic documents (e.g., the embeddings representative of the respective versions of respective electronic documents), the respective VI scores, and/or the respective token sizes, in accordance with the defined document management criteria. The first defined threshold token size can be a relaxed constraint such that the first defined threshold token size can be a desired amount or percentage (e.g., 10%, 15%, or other desired percentage less or greater than 15%) greater (e.g., higher or larger) than the maximum token size that can be input to and accommodated by the AI-based model 104 (e.g., without an error occurring, or without undesirable discarding of electronic documents by the AI-based model 104). The first defined VI score criterion can indicate that a subgroup of respective versions of respective electronic documents that has a highest (e.g., largest, greatest, or maximized) total VI score and also can satisfy the first defined threshold token size, as compared to other total VI scores associated with other subgroups of respective versions of respective electronic documents that also can satisfy the first defined threshold token size, can be the group of respective candidate versions of respective electronic documents that can be selected for further analysis and consideration.

In some embodiments, the LP relaxation technique can be formulated and employed as follows.

$$\text{Let } x_i^F,\ x_i^S, \text{ and } x_i^P$$

be binary variables that can represent whether a full version of an electronic document $d_i$, a summary version of the electronic document $d_i$, or a partial version of the electronic document $d_i$, respectively, is under consideration or selected (e.g., by the document selector component 214). The document selector component 214 can determine the group of respective candidate versions of respective electronic documents that can have satisfy an objective function:

$$\text{Maximize } \sum_{i=1}^{m} \left(VI_i^F \cdot x_i^F + VI_i^S \cdot x_i^S + VI_i^P \cdot x_i^P\right),$$

subject to:

$$\sum_{i=1}^{m} \left(\text{Size}_i^F \cdot x_i^F + \text{Size}_i^S \cdot x_i^S + \text{Size}_i^P \cdot x_i^P + \text{Size\_q}\right) \le \text{First Threshold Size},$$

and with the constraints:

$$x_i^F + x_i^S + x_i^P \leq 1 \text{ for each } i,$$

wherein m can be the number of respective versions of respective electronic documents (e.g., stored in the database 116) and associated respective metadata items to be considered and evaluated (e.g., m can be the number of respective versions of respective electronic documents as the output of LP processing for a specific query), i can indicate which (e.g., the $i^{th}$ item) of the m items is being evaluated at a particular instance, $$VI_i^F$$

can be the VI score associated with the full version of the electronic document $d_i$, $$VI_i^S$$

can be the VI score associated with the summary version of the electronic document $d_i$, $$VI_i^P$$

can be the VI score associated with the partial version of the electronic document $d_i$, $$\text{Size}_i^F$$

can be the token size associated with the full version of the electronic document $d_i$, $$\text{Size}_i^S$$

can be the token size associated with the summary version of the electronic document $d_i$, $$\text{Size}_i^P$$

can be the token size associated with the partial version of the electronic document $d_i$, Size_q can be the token size of the query, and First Threshold Size can be the first defined threshold token size.

Based at least in part on the analysis results (e.g., which can include solving the LP problem and solving for the disclosed equations (e.g., objective function equation, the "subject to" equation, and the constraints)), the document selector component 214 can solve the LP problem by relaxing the binary constraints $$(\text{e.g., } x_i^F, x_i^S, \text{ and } x_i^P),$$

allowing the binary constraints $$x_i^F, x_i^S, \text{ and } x_i^P$$

to take fractional values between 0 and 1. Based at least in part on the results of performing the LP relaxation process, the document selector component 214 can identify the candidate versions of respective electronic documents to include in the group (e.g., the preliminary or candidate group) of respective candidate versions of respective electronic documents. The LP relaxation process can result in fractional values that can indicate the relative significance (e.g., importance or relevance) of each electronic document variation (e.g., full version, summary version, or partial version of an electronic document), and the document selector component 214 can select (e.g., as candidates) respective versions of respective electronic documents where the fractional value can be desirably close to 1 as likely candidates for full content, and also can desirably handle fractions for electronic documents with fractional or summary selections (e.g., 0.7 or 0.5 or other fractional value). In some embodiments, the document selector component 214 (or other component of the document manager component 102) can determine and/or set a defined threshold fractional value (e.g., 0.4 or other desired threshold fractional value above or below 0.4) for electronic document selection, wherein the document selector component 214 can select (e.g., as candidates) respective versions (e.g., respective full, summary, or partial versions) of respective electronic documents that are associated with respective fractional values that can satisfy (e.g., can be at or above) the defined threshold fractional value. In certain other embodiments, the document selector component 214 (or other component of the document manager component 102) can determine and/or set a first defined threshold fractional value (e.g., 0.8 or other desired threshold fractional value above or below 0.8) for electronic document selection for full versions of electronic documents and a second defined threshold fractional value (e.g., 0.4 or other desired threshold fractional value above or below 0.4) for electronic document selection for other versions (e.g., summary or partial versions) of electronic documents, wherein the document selector component 214 can select (e.g., as candidates) respective full versions of respective electronic documents that are associated with respective fractional values that can satisfy (e.g., can be at or above) the first defined threshold fractional value and can select (e.g., as candidates) respective summary and/or partial versions of respective electronic documents that are associated with respective fractional values that can satisfy (e.g., can be at or above) the second defined threshold fractional value.

Accordingly, based at least in part on the analysis results, the document selector component 214 can determine which of the respective full versions of respective electronic documents, the respective summary versions of respective electronic documents, and/or the respective partial versions of respective electronic documents are to be selected to be in the group (e.g., the preliminary or candidate group) of respective candidate versions of respective electronic documents such that the total VI score of the candidate group can be the highest total VI score of all of the electronic document subgroups while also having a total token size (that also can include the token size of the query) that can satisfy (e.g., can be at or less than) the first defined threshold token size, in accordance with (e.g., to satisfy) the first defined VI score criterion.

With the group of respective candidate versions of respective electronic documents having been determined through the LP relaxation process, the document selector component 214 can perform the branch-and-bound technique to determine and select a subgroup (e.g., an enhanced or optimal subgroup) of respective versions of respective electronic documents, from the group of respective candidate versions of respective electronic documents, in accordance with the defined document management criteria. The document selector component 214 can perform the branch-and-bound technique to explore and evaluate respective combinations of the fractional selections (e.g., respective candidate versions of respective electronic documents) to determine a desirable (e.g., enhanced or optimal) solution that can maximize the total VI score (e.g., of a subgroup of respective versions of respective electronic documents from the candidate group) while satisfying a second defined threshold (e.g., threshold maximum) token size, in accordance with (e.g., to satisfy) the second defined VI score criterion. The second defined threshold token size can be determined and/or selected based at least in part on and/or to be equal to the maximum token size that can be input to or accommodated by the AI-based model 104 (e.g., for a single data input, without an error occurring, or without undesirable discarding of electronic documents by the AI-based model 104). For example, if the AI-based model 104 can handle a data input of up to 32K (e.g., in a single data input instance) without an error occurring or without undesirable discarding of electronic documents by the AI-based model 104, the second defined threshold token size can be set at 32K (or another desired size that can be less than 32K), in accordance with the defined document management criteria.

In some embodiments, as part of employing the branch-and-bound technique, the document selector component 214 can create branches by rounding the fractional selections associated with the group of respective candidate versions of respective electronic documents, wherein respective branches can comprise respective subgroups (e.g., respective combinations) of respective versions of respective electronic documents, from the group of respective candidate versions of respective electronic documents. As part of the bounding feature of the branch-and-bound technique, the document selector component 214 can determine (e.g., calculate) the upper bound of the VI score for each branch, and can prune (e.g., discard or remove from consideration) any branches that have total token sizes that do not satisfy (e.g., that exceed) the second defined threshold token size or that have a lower VI score (e.g., lower total VI score than other total VI scores of other branches associated with other subgroups of respective versions of respective electronic documents). In certain embodiments, when considering the token size constraint, for each branch, the document selector component 214 can include the token size of the query as part of the total token size of the branch (e.g., total token size for the branch can be equal to the sum of the token size of the query plus the respective token sizes associated with the respective versions of respective electronic documents of the branch). The document selector component 214 can continue, exploring and evaluating branches, including creating and/or discarding branches, until the document selector component 214 determines or identifies the desirable (e.g., enhanced or optimal) subgroup of respective versions of respective electronic documents (e.g., associated with a branch) that can satisfy the second defined threshold token size and has a highest (e.g., maximum) total VI score, as compared to other VI scores of other subgroups of respective versions of respective electronic documents (e.g., associated with other branches) that can satisfy the second defined threshold token size, in accordance with the defined document management criteria.

As a non-limiting example scenario of determining and selecting a desirable subgroup (e.g., an enhanced or optimal subgroup) of respective versions of respective electronic documents, let there be six electronic documents, D1 to D6, as embeddings for a subscription domain. As part of the non-limiting example scenario, the document manager component 102 can receive an example query from the user 108 (e.g., via the device 106). The example query can be "How is my enterprise subscription with the Enterprise going?" The query processor component 204 can analyze the query, and based at least in part on the results of such analysis, can determine or derive that the intent of the query can be "Show_Enterprise_Subscription."

The document processor component 206 can determine and generate respective full versions, respective summary versions, and/or respective partial versions of respective electronic documents based at least in part on the results of analyzing the respective electronic documents and the intent, context, and/or keywords of the query, such as described herein. The document processor component 206 and/or the tokenizer-vectorizer component 208 can tokenize, vectorize, and/or embed the respective full versions, respective summary versions, and/or respective partial versions of respective electronic documents based at least in part on the results of analyzing the respective full versions, respective summary versions, and/or respective partial versions of respective electronic documents, and the intent, context, and/or keywords of the query, such as described herein. In some embodiments, as part of the embedding, for each of the electronic documents, the document processor component 206 and/or the tokenizer-vectorizer component 208 can determine and generate a full document vector that can be representative of the full version of the electronic document, a summary document vector that can be representative of the summary version of the electronic document, and/or one or more respective partial document vectors that can be representative of the one or more respective partial versions of the electronic document. The document processor component 206 and/or the tokenizer-vectorizer component 208 can take different potential (e.g., anticipated, possible, or otherwise potential) queries, including the example query (e.g., "How is my enterprise subscription with the Enterprise going?"), and can map the intents, including the example intent (e.g., "Show_Enterprise_Subscription") and/or can map the string of tokenized keywords (and/or can map context) to the full document vector, the summary document vector, and/or the one or more partial document vectors. The VI score determinator component 210 can determine respective VI scores associated with the full version (e.g., full document vector), the summary version (e.g., summary document vector), and/or the one or more partial versions (e.g., partial document vector(s)) of the electronic document for the intent and/or keywords (and/or context) of the query, such as described herein. The token size determinator component 212 can determine the respective token sizes of the respective tokens (e.g., respective groups of tokens) of the full document vector, the summary document vector, and/or the one or more partial document vectors, such as described herein. For each electronic document, the document manager component 102 can associate (e.g., attach, link, map, or otherwise associate) the respective VI scores and the respective token sizes with the full version, the summary version, and/or the one or more partial versions of the electronic document (e.g., the respective vectors and/or embeddings that can be representative thereof) as metadata or meta tags, such as described herein. The document manager component 102 can store the respective VI scores, the respective token sizes, and the respective versions of respective electronic documents in the database 116.)

In this example scenario, the example respective VI scores (e.g., $VI^F$, $VI^S$, and $VI^P$) and respective token sizes (e.g., $Size^F$ $Size^S$, and $Size^P$) of the respective full versions (e.g., $D_1^F$ through $D_6^F$), summary versions (e.g., $D_1^S$ through $D_6^S$), and partial versions (e.g., $D_1^P$ through $D_6^P$) of the respective electronic documents D1 through D6 (e.g., respective embeddings and/or vectors that can be representative thereof) can be as presented in TABLE 1.

TABLE 1

| Electronic Document | Full VI ($VI^F$) | Full Size ($Size^F$) | Summary VI ($VI^S$) | Summary Size ($Size^S$) | Partial VI ($VI^P$) | Partial Size ($Size^P$) |
|---|---|---|---|---|---|---|
| D1 | 50 | 10.0K | 30 | 3.0K | 20 | 6.0K |
| D2 | 90 | 8.0K | 55 | 2.0K | 35 | 4.0K |
| D3 | 80 | 7.0K | 50 | 2.5K | 30 | 3.5K |
| D4 | 70 | 6.0K | 45 | 2.0K | 25 | 3.0K |
| D5 | 60 | 5.0K | 40 | 1.5K | 20 | 2.5K |
| D6 | 100 | 4.0K | 35 | 1.2K | 15 | 2.0K |

In this example scenario, the AI-based model 104 can have a maximum input token size limit (e.g., token window limit) of 32K. From the group of respective versions (e.g., full versions, summary versions, and partial versions) of respective electronic documents (e.g., D1 through D6), the document selector component 214 can perform the LP relaxation process to determine a group (e.g., a desirable or probable combination) of respective candidate versions of respective electronic documents that can satisfy the first defined threshold (e.g., first defined threshold maximum) token size (e.g., relaxed token size constraint) and the first defined VI score criterion, based at least in part on the results of analyzing the respective VI scores and the respective token sizes (e.g., as shown in TABLE 1) associated with the respective versions of respective electronic documents with respect to the intent of the query (e.g., "Show_Enterprise-_Subscription"), in accordance with the defined document management criteria. In the LP relaxation process of this example scenario, the first defined threshold token size (e.g., 35.2K) can be a relaxed (and configurable) token size constraint (e.g., 10% relaxation of the maximum input token size limit of 32K for the AI-based model 104). This LP relaxation process can provide the group of respective candidate versions of respective electronic documents that can maximize the total VI score for the query with the 10% relaxation of the token size constraint, such that the group of respective candidate versions of respective electronic documents can satisfy the relaxed token size constraint and have the highest total VI score relative to (e.g., as compared to) other total VI scores of other groups of respective candidate versions of respective electronic documents that satisfy the relaxed token size constraint, in accordance with the first defined VI score criterion. The group of respective candidate versions of respective electronic documents can be a shortlisted grouping or combination of respective versions of respective electronic documents that can be further considered and evaluated using the branch-and-bound process, and can be a desirable (e.g., wanted, suitable, or good) input for the branch-and-bound process to fine tune the document version selection to determine a desirable (e.g., suitable, enhanced, or optimal) subgroup of respective versions of respective electronic documents that can be selected for input to the AI-based model 104 for analysis in connection with responding to the query. It is to be appreciated and understood that, in other embodiments, the relaxed token size constraint can be a different percentage (e.g., 15% or other desired percentage greater or less than 15%) or amount than the 10% used in this example scenario.

For instance, in this example scenario, performing the LP relaxation process, and based at least in part on the analysis results, the document selector component 214 can determine that the group (e.g., the shortlisted group) of respective candidate versions of respective electronic documents, comprising $D_2^F$, $D_3^F$, $D_4^F$, and $D_6^F$ (full versions), $D_5^S$ (summary version), and $D_1^P$ (partial version), can maximize the total VI score while having a total token size (including the token size of the query) that can satisfy the first defined threshold token size (e.g., the relaxed token size constraint that can have the allowed error margin of 10%) for the example query. (It is noted that, in a practical scenario, the embeddings of the full, summary, and partial versions of electronic documents may be larger than the example embeddings, and the LP relaxation process can efficiently filter out the layers for specific queries.)

The document selector component 214 can perform the branch-and-bound process on the group of respective candidate versions of respective electronic documents (e.g., $D_2^F$, $D_3^F$, $D_4^F$, $D_6^F$, $D_5^S$, and $D_1^P$) to determine the desirable subgroup of respective versions of respective electronic documents that can satisfy the second defined VI score criterion and the second defined threshold token size (e.g., second defined threshold maximum token size), in accordance with the defined document management criteria. The second defined threshold token size can be 32.0K, which can be equal to the maximum token size that can be input to or accommodated by the AI-based model 104. The document selector component 214 can begin the branch-and-bound process by branching (e.g., generating branches) based on different combinations of the respective full, summary, and partial versions of respective electronic documents. For example, the group of respective candidate versions of respective electronic documents branch 1 can comprise $D_2^F$, $D_3^F$, $D_4^F$, $D_6^F$, $D_5^S$, and $D_1^P$. The document selector component 214 can determine that the total VI score for this combination (e.g., branch 1) can be 90+80+70+100+40+20=400, and the total token size can be 8K+7K+6K+4K+1.5K+6K+0.1K=32.6K (with the example query having an example token size of 0.1K). The document selector component 214 can determine that the total token size of 32.6K can exceed the second defined threshold token size of 32.0K. The document selector component 214 can branch out to generate one or more other branches that can comprise other combinations of respective candidate versions of respective electronic documents of the candidate group, and determine and evaluate the other respective total VI scores and other respective total token sizes of the other combinations. For instance, in this example scenario, the document selector component 214 can determine another branch, branch R, comprising the combination of $D_2^F$, $D_3^F$, $D_4^F$, $D_6^F$, and $D_5^S$ of the candidate group, and can determine that this branch can have a total VI score of 90+80+70+100+40=380 and a total token size of 8K+7K+6K+4K+1.5K+0.1K=26.6K, which can satisfy the second defined threshold token size.

The document selector component 214 also can perform the bounding part of the branch-and-bound process, wherein the document selector component 214 can discard any combinations of respective candidate versions of respective electronic documents of the candidate group that are determined to have total token sizes that exceed the second defined threshold token size or are determined to yield lower total VI scores (e.g., lower total VI scores than at least one other total VI score associated with another branch). For instance, the document selector component 214 can determine that branch 1 has the total token size of 32.6K, which can exceed the second defined threshold token size of 32.0K, and therefore can determine that branch 1 can be discarded from further consideration. The document selector component 214 also can determine that branch R has the total token size of 380 (e.g., a relatively higher total VI score) and has the total token size of 26.6K, which is less than the second defined threshold token size of 32.0K, and therefore can determine that branch R can be retained for further consideration. In some embodiments, the document selector component 214 can have the branches of various combinations of respective candidate versions of respective electronic documents of the candidate group in a tree format, with the respective branches being marked "discard" or "retain." During the last iteration of the branch-and-bound process, from the remaining retained branches, the document selector component 214 can determine and select one branch that satisfies the second defined threshold token size and has the highest total VI score relative to the other total VI scores of any other branches (e.g., retained branches) that have total token sizes that satisfy the second defined threshold token size. In this example scenario, the document selector component 214 can determine that branch R, comprising the combination of $D_2^F$, $D_3^F$, $D_4^F$, $D_6^F$, and $D_5^S$ of the candidate group, has the highest total VI score (e.g., 380) of the remaining retained branches and a total token size of 26.6K, which satisfies the second defined threshold token size, and accordingly, the document selector component 214 can select the combination of $D_2^F$, $D_3^F$, $D_4^F$, $D_6^F$, and $D_5^S$ of branch R to be the group of respective versions of respective electronic documents, in accordance with the defined document management criteria.

In contrast, if an existing RAG technique had been employed, the RAG technique would pick electronic documents $D_1$, $D_2$, $D_3$, and $D_4$, which would have a total VI score of 50+90+80+70=290, and the total token size can be 10K+8K+7K+6K+0.1K=31.1K, which has a significantly lower total VI score, while also having a larger total token size, as compared to the document combination selected by the document selector component 214 using the disclosed techniques. Thus, the document combination determined using the existing RAG technique can be less desirable (e.g., unwanted, unsuitable, or suboptimal) than the document combination selected by the document selector component 214 using the disclosed techniques. It is noted that, when using the existing RAG technique, if electronic document D5 had been added to the document combination of D1, D2, D3, and D4, the total token size of D1, D2, D3, D4, and D5 would be 36.1K, and thus would undesirably exceed the second defined threshold token size (e.g., which can result in an error being generated).

With the group of respective versions of respective electronic documents selected, the document manager component 102 can retrieve the group of respective versions of respective electronic documents from the database 116, and can input the group of respective versions of respective electronic documents into the AI-based model 104 for analysis.

Based at least in part on performing an AI-based analysis on the group of respective versions of respective electronic documents, the AI-based model 104 can determine, infer, and/or generate a response to the query, wherein the response (e.g., response message) can comprise response information that can be responsive to the query, and wherein the AI-based model 104 can determine, derive, and/or infer the response information from the group of respective versions of respective electronic documents.

The document manager component 102 or AI-based model 104 can present (e.g., communicate or display) the response to the device 106 and/or user 108 for consideration, review, and/or another desired purpose. In some embodiments, the user 108 and/or device 106 can provide feedback information relating to the response to the feedback component 216. The feedback information can indicate whether the response information was accurate or acceptable, or instead was inaccurate or unacceptable, can indicate what other type of information was not included in the response, but may be desired by the user 108 and/or device 106, can indicate or recommend (e.g., suggest) a change relating to the response that can be changed to facilitate improving the response, and/or can indicate or recommend another change or another way to improve the response. The feedback information can facilitate improving future electronic document selection by the document selector component 214 in connection with future queries, future analysis by the AI-based model 104, and future query responses by the AI-based model 104. In certain embodiments, additionally or alternatively, the user 112 (e.g., SME or other user) and/or the device 110 can provide additional feedback information relating to the query and/or response to facilitate improving future electronic document selection by the document selector component 214 in connection with future queries, future analysis by the AI-based model 104, and future query responses by the AI-based model 104.

The update component 218 can analyze the feedback information, the additional feedback information, the selected group of respective versions of respective electronic documents (or all or part of the group of respective versions of respective electronic documents), the VI scores and/or token sizes associated with the selected group, the response information, the query, and/or other information relating to the query and/or response. Based at least in part on the results of such analysis, the update component 218 can determine an update, comprising update information, relating to a query(ies), VI score(s), and/or version(s) of an electronic document(s) that can facilitate improving future electronic document (e.g., electronic document version) selection by the document selector component 214 in connection with future queries, future analysis by the AI-based model 104, and future query responses by the AI-based model 104. For instance, based at least in part on the results of such analysis, the update component 218 can determine an update to modify a partial version, summary version, or full version of an electronic document (e.g., of the group or the selected group), modify a VI score associated with a partial version, summary version, or full version of an electronic document (e.g., of the group or the selected group), determine a VI score for a modified partial version, summary version, or full version of an electronic document, modify an initial query, add the received query to the group of queries (e.g., group comprising the initial queries), determine a new initial query, or perform another type of update. The update component 218 can perform or facilitate performing the update relating to the query(ies), VI score(s), and/or version(s) of electronic document(s). The update component 218 can store the updated information (e.g., modified electronic document version, modified VI score, new VI score associated with the modified electronic document version, modified initial query, received query, and/or other updated item) in the data store 114 and/or the database 116.

The system 100, including the document manager component 102, the AI-based model 104, the database 116, and/or other components (e.g., as updated), can continue to receive, process, and response to queries, such as described herein.

With further regard to the processor component 220 and the data store 114, the processor component 220 can employ one or more processors (e.g., one or more central processing units (CPUs)), accelerators, graphics processing units (GPUs), application-specific integrated circuits (ASICs), microprocessors, or controllers that can process information relating to data, files, database 116, electronic documents, queries, query responses, tokens, vectorized, tokenized, and/or embedded content of electronic documents, VI scores, token sizes, AI-based models, AI-related data, model training data, feedback information, update information, parameters (e.g., hyperparameters and other parameters), thresholds values (e.g., threshold token size values or other threshold values), weight values, applications, services, devices, users, resources, data processing operations, messages, notifications, alarms, alerts, preferences (e.g., user or client preferences), hash values, metadata, traffic flows, tables, mappings, policies, defined document management criteria, algorithms (e.g., enhanced document management and/or selection algorithms, LP relaxation algorithms, branch-and-bound algorithms, tokenization, vectorization, and/or embedding algorithms, hash algorithms, knapsack algorithms, logical modeling algorithms, data compression algorithms, data decompression algorithms, and/or other algorithm), interfaces, application programming interfaces (APIs), protocols, tools, and/or other information, to facilitate operation of the document manager component 102 and the system 100, and control data flow between the document manager component 102 and/or other components (e.g., a computer-based system, a device, a node, an application, a service, a user, the communication network, network equipment or components, or other entity) associated with the document manager component 102 and the system 100.

The data store 114 can store data structures (e.g., user data, metadata), code structure(s) (e.g., modules, objects, hashes, classes, procedures) or instructions, information relating to data, files, database 116, electronic documents, queries, query responses, tokens, vectorized, tokenized, and/or embedded content of electronic documents, VI scores, token sizes, AI-based models, AI-related data, model training data, feedback information, update information, parameters (e.g., hyperparameters and other parameters), thresholds values (e.g., threshold token size values or other threshold values), weight values, applications, services, devices, users, resources, data processing operations, messages, notifications, alarms, alerts, preferences (e.g., user or client preferences), hash values, metadata, traffic flows, tables, mappings, policies, defined document management criteria, algorithms (e.g., enhanced document management and/or selection algorithms, LP relaxation algorithms, branch-and-bound algorithms, tokenization, vectorization, and/or embedding algorithms, hash algorithms, knapsack algorithms, logical modeling algorithms, data compression algorithms, data decompression algorithms, and/or other algorithm), interfaces, APIs, protocols, tools, and/or other information, to facilitate controlling or performing operations associated with the document manager component 102 and the system 100. The data store 114 can comprise volatile and/or non-volatile memory, such as described herein. In an aspect, the processor component 220 can be functionally coupled (e.g., through a memory bus) to the data store 114 in order to store and retrieve information desired to operate and/or confer functionality, at least in part, to the query generator component 202, query processor component 204, document processor component 206, tokenizer-vectorizer component 208, VI score determinator component 210, token size determinator component 212, document selector component 214, feedback component 216, update component 218, processor component 220, data store 114, AI-based models, and/or other component of or associated with the document manager component 102, and/or substantially any other operational aspects of the document manager component 102 and the system 100.

As disclosed, the data store 114 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The disclosed subject matter, by employing the document manager component 102 and the techniques described herein, can provide desirable (e.g., suitable, enhanced, or optimal) and dynamic content variation, as the document manager component 102 and the techniques described herein can incorporate a full version, summary version, and/or partial version(s) of each electronic document (e.g., full, summary, and/or partial embeddings for each electronic document), which can enable a more flexible and tailored content retrieval (e.g., context aware content retrieval) that can enhance relevance of the content retrieved in connection with a query while adhering to token size constraints of the input of the AI-based model, as compared to existing techniques, such as the RAG technique, for content retrieval in connection with queries. Existing techniques, such as the RAG technique, typically can retrieve electronic documents as whole units without generating, considering, or using variations of electronic documents, such as summary content or partial content associated with full content of an electronic document.

In some embodiments, the disclosed subject matter, by employing the document manager component 102 and the techniques described herein, can desirably employ an enhanced approach that can comprise performing the LP relaxation process with an error margin (e.g., the relaxed token size constraint) that can enable the document manager component 102 to desirably shortlist electronic documents to determine a group of respective candidate versions of respective electronic documents, which can ensure a desirable (e.g., suitable, useful, or enhanced) balance between a desirably high information value (e.g., desirably high, enhanced, or optimal VI score) and computational efficiency of the system in connection with processing and responding to a query. In contrast, existing techniques, such as the RAG technique, can rely on straightforward electronic document retrieval mechanisms that do not utilize or leverage advanced optimization techniques.

In certain embodiments, the disclosed subject matter, by employing the document manager component 102 and the techniques described herein, can desirably employ an adaptive token enhancement that can comprise the document manager component 102 performing the branch-and-bound process to refine electronic document selection by determining a group of respective versions (e.g., full, summary, and/or partial versions) of respective electronic documents from the group of respective candidate versions of respective electronic documents, which can desirably focus on enhancing (e.g., maximizing) value information (e.g., a highest, enhanced, or maximum total VI score) while not exceeding the maximum token size limit for input to the AI-based model in connection with processing and responding to a query. This can ensure that the most relevant electronic document content can be included as input to the AI-based model for analysis to determine a desirable response to the query. In contrast, existing techniques, such as the RAG technique, can lack sophisticated and enhanced refinement processes after the initial retrieval of electronic documents in connection with a received query, which often can result in undesirable or suboptimal electronic document content selection.

In some embodiments, the disclosed subject matter, by employing the document manager component 102 and the techniques described herein, desirably can employ an enhanced approach where the document manager component 102 can combine the LP relaxation process and the branch-and-bound process to ensure that the final selection of versions of electronic documents (e.g., the desirable subgroup of respective full, summary, and/or partial versions of respective electronic documents) can provide the highest possible value within (e.g., that can satisfy) the token size constraints of the input of the AI-based model, which can result in more efficient resource usage by the system, as compared to existing techniques, such as the RAG technique, for content retrieval in connection with queries. Existing techniques, such as the RAG technique, may undesirably include electronic documents that either exceed the token size constraints of the input of the AI-based model or fail to maximize relevance, which can lead to or result in undesirable inefficiencies and query response results.

In certain embodiments, the disclosed subject matter, by employing the document manager component 102 and the techniques described herein, desirably can employ a feedback loop for continuous improvement in electronic document selection, wherein the feedback loop can identify and re-score (e.g., modify VI scoring of) queries and/or associated versions of electronic documents that are associated with suboptimal query responses to facilitate enhancing electronic document selection (e.g., selection of full, summary, and/or partial versions of electronic documents). This iterative refinement of electronic document selection can improve future selection and retrievals of full, summary, and/or partial versions of electronic documents, which can ensure that the system adapts and improves over time. In contrast, existing techniques typically can lack such a feedback mechanism to address and correct suboptimal electronic document retrievals.

Figure 4:
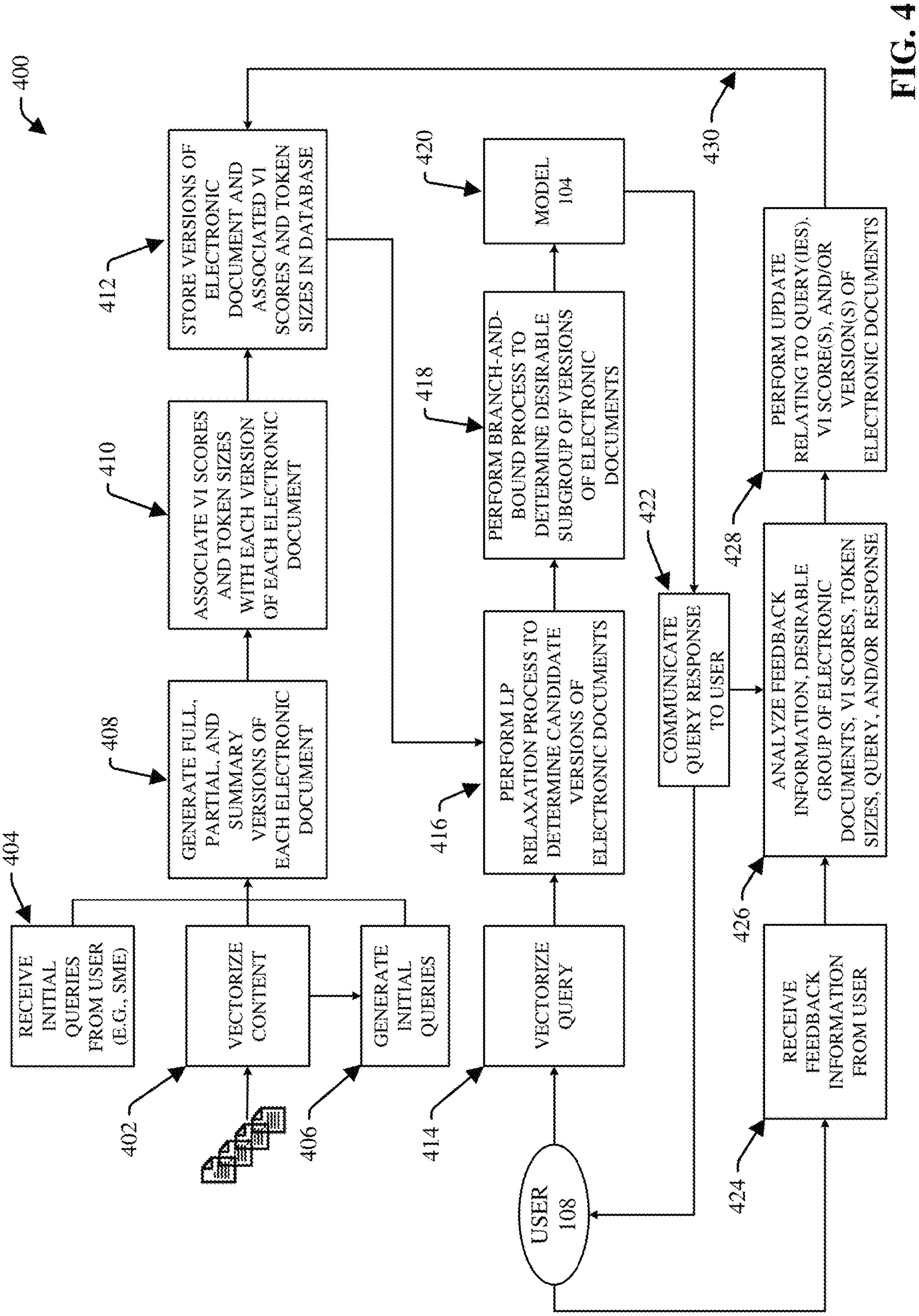
FIG. 4 depicts a block diagram of a non-limiting example process flow that desirably can be utilized to perform context aware content retrieval using logical modeling in connection with queries, in accordance with various aspects and embodiments of the disclosed subject matter.

Referring to FIG. 4 (along with FIGS. 1 and 2), FIG. 4 depicts a block diagram of a non-limiting example process flow 400 that desirably (e.g., automatically, dynamically, suitably, reliably, efficiently, enhancedly, and/or optimally) can be utilized to perform context aware content retrieval using logical modeling in connection with queries, in accordance with various aspects and embodiments of the disclosed subject matter. The example process flow 400 can illustrate respective interactions between respective components of the document manager component 102 and/or other components or devices.

As indicated at reference numeral 402 of the example process flow 400, the document processor component 206 and/or the tokenizer-vectorizer component 208 can vectorize respective content of respective electronic documents of a group of electronic documents accessed or received by the document manager component 102 based at least in part on the results of analyzing the group of electronic documents, such as described herein. As indicated at reference numeral 404 of the example process flow 400, the document manager component 102 can receive some initial queries relating to the group of electronic documents from the user 112 (e.g., SME) and/or associated device 110, wherein such initial queries can be determined by the user 112 based at least in part on the results of the user 112 analyzing the group of electronic documents and based on the knowledge the user 112 can have regarding the domain associated with the group of electronic documents, such as described herein. As indicated at reference numeral 406 of the example process flow 400, the query generator component 202 also can determine and generate (e.g., automatically determine and generate) some other initial queries relating to the group of electronic documents based at least in part on the results analyzing the group of electronic documents (e.g., the respective vectorized content that can be representative of the respective electronic documents of the group of electronic documents), such as described herein. The initial queries determined by the query generator component 202 and/or the user 112 can be the types of queries that can be anticipated or likely to be asked by users (e.g., user 108) and/or other entities (e.g., device 106) in connection with or with respect to the group of electronic documents (e.g., the respective vectorized content thereof).

As indicated at reference numeral 408 of the example process flow 400, the document processor component 206 can determine and generate (e.g., automatically determine and generate) respective full versions, respective summary versions, and respective partial versions of respective electronic documents of the group of electronic documents based at least in part on the results of analyzing the group of electronic documents and/or the initial queries (e.g., the respective contexts, respective intents, and/or respective keywords of the respective initial queries), such as described herein. As indicated at reference numeral 410 of the example process flow 400, the VI score determinator component 210 can determine and generate (e.g., automatically determine and generate) respective VI scores relating to the respective full versions, respective summary versions, and respective partial versions of respective electronic documents, the token size determinator component 212 can determine and generate (e.g., automatically determine and generate) respective token sizes relating to the respective groups of tokens that can be representative of the respective full versions, respective summary versions, and respective partial versions of respective electronic documents, and the document manager component 102 can associate the respective VI scores and the respective token sizes with the respective full versions, respective summary versions, and respective partial versions of respective electronic documents. As indicated at reference numeral 412 of the example process flow 400, the document manager component 102 (e.g., the VI score determinator component 210, the token size determinator component 212, and/or other component thereof) can store the respective embeddings of the respective vectorized and tokenize content of the respective full versions, respective summary versions, and respective partial versions of respective electronic documents, the respective VI scores and the respective token sizes of the respective full versions, respective summary versions, and respective partial versions of respective electronic documents, and/or the respective mappings relating thereto in the database 116 of the data store 114, such as described herein.

As indicated at reference numeral 414 of the example process flow 400, the document manager component 102 can receive a query from the device 106 and/or the user 108, and the query processor component 204 and/or the tokenizer-vectorizer component 208 can vectorize and/or tokenize the query information of the query. As indicated at reference numeral 416 of the example process flow 400, from the group of respective versions (e.g., full versions, summary versions, and partial versions) of respective electronic documents, the document selector component 214 can perform the LP relaxation process to determine a group of respective candidate versions of respective electronic documents that can satisfy the first defined threshold token size (e.g., relaxed token size constraint) and the first defined VI score criterion, based at least in part on the results of analyzing the respective VI scores and the respective token sizes associated with the respective versions of respective electronic documents with respect to the intent of the query, in accordance with the defined document management criteria, such as described herein. A subgroup of respective versions of respective electronic documents that has a highest (e.g., largest, greatest, or maximized) total VI score and also can satisfy the first defined threshold token size, as compared to other total VI scores associated with other subgroups of respective versions of respective electronic documents that also can satisfy the first defined threshold token size, can satisfy the first defined VI score criterion and can be the group of respective candidate versions of respective electronic documents that can be selected for further analysis and consideration.

As indicated at reference numeral 418 of the example process flow 400, the document selector component 214 can perform the branch-and-bound process on the group of respective candidate versions of respective electronic documents to determine a desirable (e.g., suitable, enhanced, or optimal) subgroup of respective versions of respective electronic documents that can satisfy the second defined VI score criterion and the second defined threshold token size, in accordance with the defined document management criteria, such as described herein. The second defined threshold token size can be equal to the maximum token size that can be input to or accommodated by the AI-based model 104. The subgroup of respective versions of respective electronic documents that has a highest total VI score and also can satisfy the second defined threshold token size, as compared to other total VI scores associated with other subgroups of respective versions of respective electronic documents that also can satisfy the second defined threshold token size, can satisfy the second defined VI score criterion and can be the desirable (e.g., suitable, enhanced, or optimal) subgroup of respective versions of respective electronic documents that can be selected for input into the AI-based model 104 for analysis in connection with the query.

As indicated at reference numeral 420 of the example process flow 400, the document manager component 102 can input the desirable subgroup of respective versions of respective electronic documents and the query (e.g., in tokenized and vectorized form) into the AI-based model 104 for analysis in connection with the query, and the AI-based model 104 can determine and generate a response to the query based at least in part on the results of performing an AI-based analysis on the query and the desirable subgroup of respective versions of respective electronic documents. As indicated at reference numeral 422 of the example process flow 400, the AI-based model 104 and/or the document manager component 102 can communicate a response to the query to the user 108 and/or device 106 associated with the user 108, wherein the response can comprise response information that can be relevant and responsive to the query.

As indicated at reference numeral 424 of the example process flow 400, the document manager component 102 can receive feedback information relating to the query response from the user 108 and/or the device 106 associated with the user 108. The feedback information, for example, can indicate whether the response information was accurate or acceptable, or instead was inaccurate or unacceptable, can indicate what other type of information was not included in the response, but may be desired by the user 108 and/or device 106, can indicate or suggest a change relating to the response that can be changed to facilitate improving the response, and/or can indicate or recommend another change or another way to improve the response to the query.

As indicated at reference numeral 426 of the example process flow 400, the update component 218 can analyze the feedback information, the desirable group of respective versions of respective electronic documents, the VI scores and/or token sizes associated with the desirable group, the response information, the query, and/or other information relating to the query and/or response. Based at least in part on the results of such analysis, the update component 218 can determine an update, comprising update information, relating to a query(ies), VI score(s), and/or version(s) of an electronic document(s) (e.g., modify a partial, summary, or full version of an electronic document, modify a VI score associated with a partial, summary, or full version of an electronic document, determine a VI score for a modified partial, summary, or full version of an electronic document, and/or another type of update) that can facilitate improving future electronic document (e.g., electronic document version) selection by the document selector component 214 in connection with future queries, future analysis by the AI-based model 104, and future query responses by the AI-based model 104, such as described herein.

As indicated at reference numeral 428 of the example process flow 400, the update component 218 can perform or facilitate performing the update relating to the query(ies), VI score(s), and/or version(s) of electronic document(s), such as described herein. As indicated at reference numeral 430 of the example process flow 400, the update component 218 can store the updated information (e.g., modified electronic document version, modified VI score, new VI score associated with the modified electronic document version, modified initial query, received query, and/or other updated item) in the data store 114 and/or the database 116.

Figure 5:
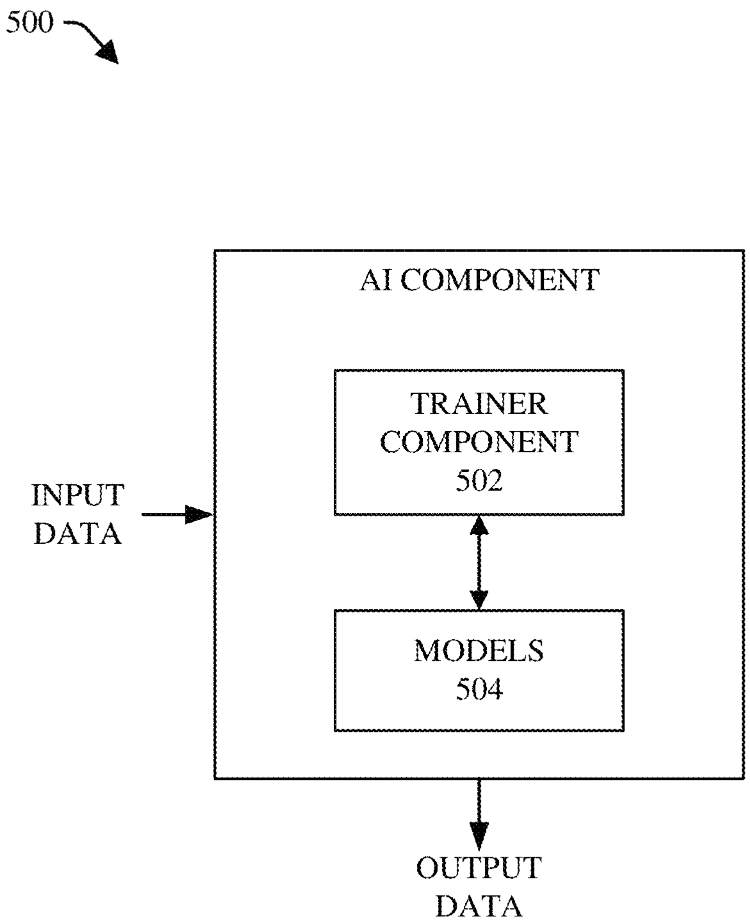
FIG. 5 depicts a block diagram of a non-limiting example AI component that can comprise or can be associated with AI-based models that can perform AI-based analysis on data, in accordance with various aspects and embodiments of the disclosed subject matter.

Referring to FIG. 5, FIG. 5 depicts a block diagram of a non-limiting example AI component 500 that can comprise or can be associated with AI-based models that can perform AI-based analysis on data, in accordance with various aspects and embodiments of the disclosed subject matter. The AI component 500 can perform or facilitate performing (e.g., can employ one or more models (e.g., AI-based model 104, LLM, BERT-type model, a GPT-type model, a BART-type model, a T5-type model, or other desired type of AI-based model to perform) AI-based analysis on data and generate AI-based analysis results, in accordance with various aspects and embodiments of the disclosed subject matter.

In some embodiments, the AI component 500 can comprise or be associated with the trainer component 502, and the one or more models 504 (e.g., AI-based model 104, LLM, BERT-type model, GPT-type model, BART-type model, T5-type model, or other desired type of AI-based model). The trainer component 502 can input training data, feedback-related data, and/or other data into a model 504 to facilitate training or refining training (e.g., updating or further training) the model 504, wherein the model 504 can analyze the training data, feedback-related data, and/or other data as part of the training of the model 504. In certain embodiments, the model 504 can be pre-trained, and the trainer component 502 may be employed to facilitate updating training of the model 504.

In accordance with various embodiments, the AI component 500 can employ, build (e.g., construct or create), and/or import, AI-based techniques and algorithms, AI-based models, transformer-based models, neural networks, LLMs, decision trees, Markov chains (e.g., trained Markov chains), and/or graph mining models to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining a response to a query (e.g., with regard to AI-based model 104), determining a partial version, a summary version, or a full version of an electronic document (e.g., with regard to the BERT-type model, GPT-type model, BART-type model, T5-type model, or other type of model), determining an embedding for a partial version, a summary version, or a full version of an electronic document, determining a token or a vector for a partial version, a summary version, or a full version of an electronic document, performing other desired functions or operations, and/or automating one or more functions or features of the disclosed subject matter, as more fully described herein.

The AI component 500 and the model(s) 504 can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 500 and/or the model(s) 504 can examine the entirety or a subset of the data (e.g., the training data; tokenized, vectorized, and/or embedded data; label data; the feedback information; operational data; and/or other information, such as described herein) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

In some embodiments, the AI component 500 and/or the model(s) 504 can employ a classifier that can perform an AI-based analysis on data. A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

It is to be appreciated and understood that one or more components (e.g., the document manager component, processor component, models, devices, or other components) of the systems (e.g., the system 100, the system 200, or other system) or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 that can desirably (e.g., automatically, dynamically, suitably, reliably, efficiently, enhancedly, and/or optimally) perform context aware content retrieval using VI scores to determine respective versions of respective electronic documents to input into the AI-based model for analysis in connection with a query, in accordance with various aspects and embodiments of the disclosed subject matter. The method 600 can be employed by, for example, a system comprising the document manager component, the processor component, the data store, and/or other components, wherein the document manager component can comprise various components, such as described herein.

At 602, with regard to a group of respective versions of respective electronic documents, respective VI scores associated with the respective versions of respective electronic documents can be determined based at least in part on a result of a first analysis of the respective versions of respective electronic documents, wherein the group of respective versions of respective electronic documents can comprise respective first versions of respective electronic documents and respective second versions of respective electronic documents that can be variations of the respective first versions of respective electronic documents. The VI determinator component can determine the respective VI scores associated with the respective versions of respective electronic documents based at least in part on the result of the first analysis of the respective versions of respective electronic documents, such as described herein. The respective first versions of respective electronic documents can be respective full versions of respective electronic documents, and the respective second versions of respective electronic documents can comprise respective partial versions of respective electronic documents and/or respective summary versions of respective electronic documents that can be derived from, and can be variations of, the respective full versions of respective electronic documents.

At 604, in connection with a query, and from the group of respective versions of respective electronic documents, a subgroup of respective versions of respective electronic documents to input to an AI-based model for a second analysis can be determined based at least in part on a threshold token size associated with the AI-based model and the respective VI scores and respective token sizes associated with the respective versions of respective electronic documents, wherein the subgroup of respective versions of respective electronic documents can be input into the AI-based model for the second analysis to facilitate determining a response to the query. For instance, in connection with the query, and from the group of respective versions of respective electronic documents, the document selector component can determine and select the subgroup of respective versions of respective electronic documents that can be input into the AI-based model for the second analysis by the AI-based model based at least in part on the threshold token size associated with the AI-based model and the respective VI scores and respective token sizes associated with the respective versions of respective electronic documents, such as described herein. The subgroup of respective versions of respective electronic documents can be input into the AI-based model for the second analysis to facilitate determining the response to the query.

FIG. 7 depicts a flow chart of an example method 700 that can desirably (e.g., automatically, dynamically, suitably, reliably, efficiently, enhancedly, and/or optimally) determine respective full versions, respective partial versions, and/or respective summary versions of respective electronic documents, and respective VI scores and respective token sizes associated therewith, to facilitate managing and performing context aware content retrieval to facilitate determining content to input into the AI-based model for analysis in connection with a query, in accordance with various aspects and embodiments of the disclosed subject matter. The method 700 can be employed by, for example, a system comprising the document manager component, the processor component, the data store, and/or other components, wherein the document manager component can comprise various components, such as described herein.

At 702, respective electronic documents can be analyzed. The document manager component can analyze the respective content of the respective electronic documents.

At 704, a group of initial queries relating to the electronic documents can be generated and/or received based at least in part on the results of the analysis of the respective electronic documents, wherein the initial queries can be queries that have been determined to be expected or potential queries that may be asked by users. Based at least in part on the analysis results, the document manager component, employing the query generator component, can determine and generate some or all of the initial queries (e.g., potential and/or pre-created queries), and/or can receive some or all of the initial queries from one or more users (e.g., one or more subject matter experts or other users with knowledge of the respective content of the respective electronic documents). The document manager component, employing the query generator component, can determine that the initial queries satisfy the defined threshold likelihood value of being asked by a user with respect to the respective electronic documents.

At 706, based at least in part on the analysis results and/or the group of initial queries, respective full versions of the respective electronic documents, respective partial versions of the respective electronic documents, and/or respective summary versions of the respective electronic documents can be generated. For instance, based at least in part on the analysis results and/or the group of initial queries, the document manager component, employing the document processor component, can determine and generate the respective full versions of the respective electronic documents, the respective partial versions of the respective electronic documents, and/or the respective summary versions of the respective electronic documents, such as described herein. In some embodiments, as part of the analysis, and the document processor component can vectorize and/or embed the respective content of the respective electronic documents, such as described herein.

At 708, respective VI scores and respective token sizes associated with the respective full versions of the respective electronic documents, the respective partial versions of the respective electronic documents, and/or the respective summary versions of the respective electronic documents can be determined based at least in part on the results of analyzing the respective full versions of the respective electronic documents, the respective partial versions of the respective electronic documents, and/or the respective summary versions of the respective electronic documents. For instance, based at least in part on the results of the analysis of the respective full versions, the respective partial versions, and/or the respective summary versions of the respective electronic documents in relation to the respective initial queries, the VI determinator component can determine (e.g., calculate) and generate the respective VI scores associated with (e.g., applicable to) the respective full versions, the respective partial versions, and/or the respective summary versions of the respective electronic documents, such as described herein. Also, based at least in part on the analysis results, the token size determinator component can determine the respective token sizes associated with the respective full versions, the respective partial versions, and/or the respective summary versions of the respective electronic documents.

At 710, respective token sizes associated with the respective full versions of the respective electronic documents, the respective partial versions of the respective electronic documents, and/or the respective summary versions of the respective electronic documents can be determined based at least in part on the results of analyzing the respective full versions of the respective electronic documents, the respective partial versions of the respective electronic documents, and/or the respective summary versions of the respective electronic documents. For instance, the token size determinator component can determine (e.g., measure or calculate) and generate the respective token sizes associated with (e.g., applicable to, attached to, mapped to, or linked to) the respective full versions, the respective partial versions, and/or the respective summary versions of the respective electronic documents, such as described herein.

At 712, the respective full versions of the respective electronic documents, the respective partial versions of the respective electronic documents, and/or the respective summary versions of the respective electronic documents, and the respective VI scores and respective token sizes associated therewith, can be stored in the database. The document manager component can store the respective full versions, the respective partial versions, and/or the respective summary versions of the respective electronic documents, and the respective VI scores and respective token sizes associated therewith (e.g., applicable, attached, mapped, or linked thereto), in the database stored in the data store. In some embodiments, the method 700 can proceed to reference point A, wherein the method 800 depicted in FIG. 8 can proceed from reference point A, such as described herein and shown in FIG. 8.

FIG. 8 depicts a flow chart of an example method 800 that can desirably (e.g., automatically, dynamically, suitably, reliably, efficiently, enhancedly, and/or optimally) manage and perform context aware content retrieval to facilitate determining certain content (e.g., certain respective full, partial, and/or summary versions of respective electronic documents) to input into the AI-based model for analysis in connection with a query, in accordance with various aspects and embodiments of the disclosed subject matter. The method 800 can be employed by, for example, a system comprising the document manager component, the processor component, the data store, and/or other components, wherein the document manager component can comprise various components, such as described herein. In some embodiments, the method 800 can proceed from reference point A.

At 802, a query relating to at least some of the electronic documents can be received. At 804, context, intent, and/or keywords of the query, and a token size of the query, can be determined based at least in part on the results of analyzing the query. The document manager component can receive the query from a device and/or user. The document manager component, employing the query processor component, can analyze the query. Based at least in part on the results of such analysis, the query processor component can determine the context, intent, and/or keywords of the query, and the token size of the query.

At 806, respective VI scores and respective token sizes associated with the respective versions of respective electronic documents and the context, intent, and/or keywords of the query can be analyzed. The document manager component, employing the document selector component, can analyze the respective VI scores and the respective token sizes associated with the respective versions of respective electronic documents (e.g., in relation to the context, intent, and/or keywords of the query) and the context, intent, and/or keywords of the query.

At 808, based at least in part on the results of analyzing the respective VI scores and the respective token sizes associated with the respective electronic documents and the token size of the query, and from the respective versions of respective electronic documents, a group of respective candidate versions of respective electronic documents, which can satisfy a first defined threshold token size and a first defined VI score criterion, can be determined, wherein the group of respective candidate versions of respective electronic documents can comprise one or more of the respective full versions, the respective partial versions, and/or the respective summary versions of the respective electronic documents. For instance, from the respective versions of respective electronic documents (e.g., the group of respective versions of respective electronic documents), the document selector component can determine the group (e.g., the candidate group) of respective candidate versions of respective electronic documents that can satisfy the first defined threshold token size and the first defined VI score criterion.

In some embodiments, the first defined threshold token size can be a relaxed constraint (e.g., when utilizing the LP relaxation technique) that can be a desired percentage or amount greater than the maximum token size that can be handled by the AI-based model (and the amount of the second defined threshold token size that can be utilized to determine the subgroup (e.g., final or selected subgroup) of respective versions of respective electronic documents that can be input to the AI-based model), such as described herein. The total token size of the query and the respective candidate versions of respective electronic documents can be less than or equal to the first defined threshold token size. In certain embodiments, the first defined VI score criterion can indicate that a subgroup of respective versions of respective electronic documents that has a highest (e.g., maximized) total VI score and also can satisfy the first defined threshold token size, as compared to other total VI scores associated with other subgroups of respective versions of respective electronic documents that also can satisfy the first defined threshold token size, can be the group of respective candidate versions of respective electronic documents, such as described herein.

At 810, from the group of respective candidate versions of respective electronic documents, and based at least in part on the results of analyzing the token size of the query and the respective VI scores and the respective token sizes of the respective candidate versions of respective electronic documents, a subgroup of respective versions of respective electronic documents that can satisfy the second defined threshold token size and a second defined VI score criterion can be determined, wherein the subgroup of respective versions of respective electronic documents can be selected for input into the AI-based model for analysis in connection with the query. For example, from the respective candidate versions of respective electronic documents of the candidate group, the document selector component can determine and select the subgroup of respective versions of respective electronic documents that can satisfy the second defined threshold token size and the second defined VI score criterion. In certain embodiments, the document selector component can employ the branch-and-bound technique to facilitate determining the subgroup of respective versions of respective candidate electronic documents from the candidate subgroup, such as described herein.

In some embodiments, the second defined threshold token size can be based at least in part on or equal to the maximum token size that can be handled by the AI-based model, such as described herein. The second defined threshold token size typically can be smaller than the first defined threshold token size. The total token size of the query and the respective versions of respective electronic documents of the subgroup of respective versions of respective electronic documents can be less than or equal to the second defined threshold token size. In certain embodiments, the second defined VI score criterion can indicate that a subgroup of respective versions of respective electronic documents of the candidate group that has a highest (e.g., maximized) total VI score and also can satisfy the second defined threshold token size, as compared to other total VI scores associated with other subgroups of respective versions of respective electronic documents of the candidate group that also can satisfy the second defined threshold token size, can be the subgroup of respective versions of respective electronic documents that can be selected for input into the AI-based model, such as described herein.

Figure 9:
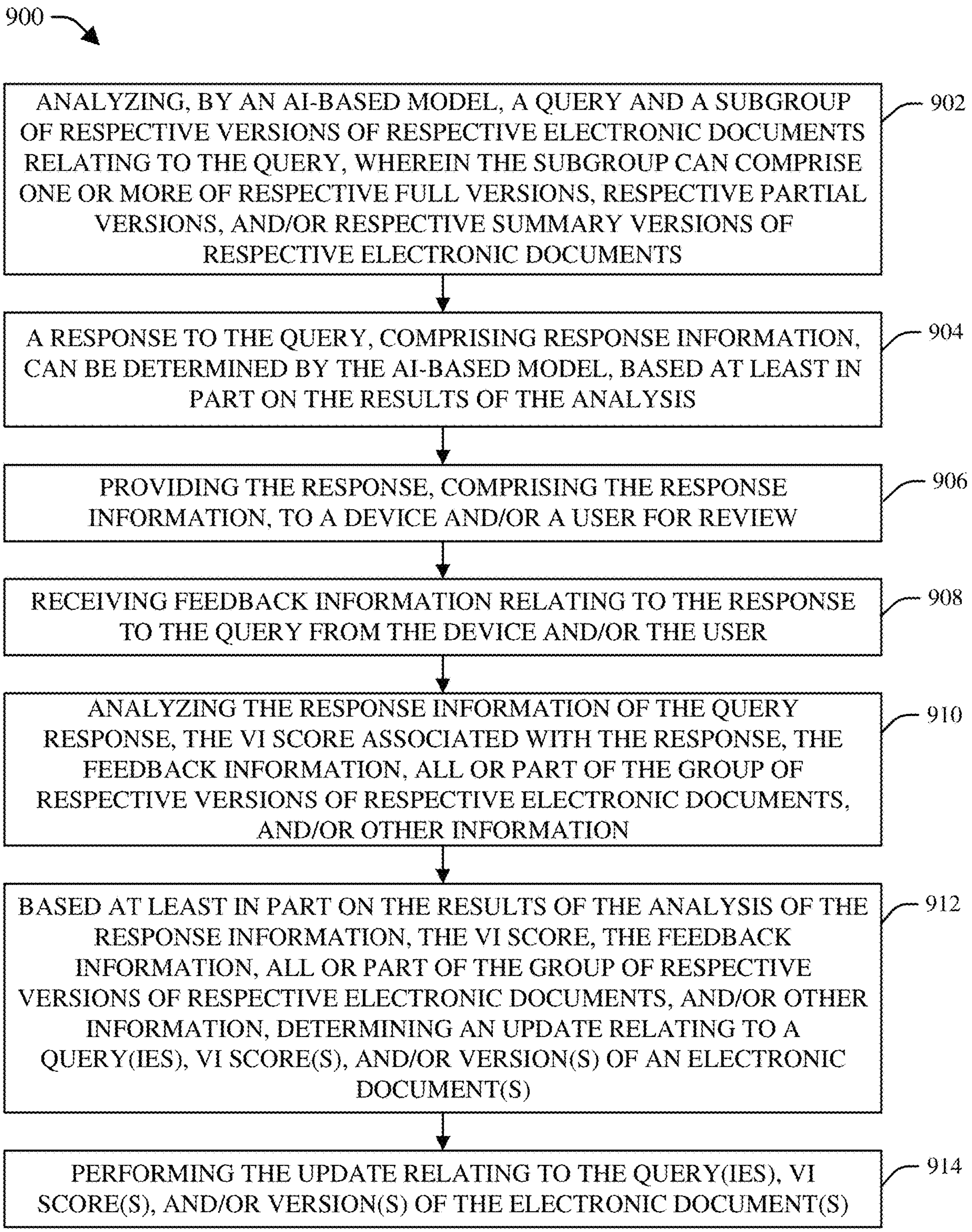
FIG. 9 depicts a flow chart of an example method that can desirably determine and perform an update relating to a query(ies), VI score(s), and/or version(s) of an electronic document(s) to facilitate managing and performing context aware content retrieval to facilitate determining content to input into the AI-based model for analysis in connection with a query, in accordance with various aspects and embodiments of the disclosed subject matter.

FIG. 9 depicts a flow chart of an example method 900 that can desirably (e.g., automatically, dynamically, suitably, reliably, efficiently, enhancedly, and/or optimally) determine and perform an update relating to a query(ies), VI score(s), and/or version(s) of an electronic document(s) to facilitate managing and performing context aware content retrieval to facilitate determining content to input into the AI-based model for analysis in connection with a query, in accordance with various aspects and embodiments of the disclosed subject matter. The method 900 can be employed by, for example, a system comprising the document manager component, the processor component, the data store, AI-based model, and/or other components, wherein the document manager component can comprise various components, such as described herein.

At 902, a query and a subgroup of respective versions of respective electronic documents relating to the query can be analyzed by an AI-based model, wherein the subgroup can comprise one or more of respective full versions, respective partial versions, and/or respective summary versions of respective electronic documents. The document manager component can determine and select the subgroup of respective versions of respective candidate electronic documents, such as described herein. The document manager component can input the query and the subgroup of respective versions of respective electronic documents (e.g., the tokens of the query and the tokens of the subgroup of respective versions of respective electronic documents) into the AI-based model. The AI-based model can perform an AI-based analysis on the query and the subgroup of respective versions of respective candidate electronic documents.

At 904, a response to the query, comprising response information, can be determined by the AI-based model based at least in part on the results of the analysis. The AI-based model can determine and generate the response, comprising the response information, based at least in part on the results of the AI-based analysis the AI-based model performed on the query and the subgroup of respective versions of respective electronic documents. The AI-based model can generate the response to the query as an output. The document manager component can receive the response to the query from the AI-based model.

At 906, the response, comprising the response information, can be provided to a device and/or a user for review. The document manager component can provide (e.g., communicate, display, or present) the response, comprising the response information, to the device and/or the user for review. The user and/or the device can analyze (e.g., review and/or evaluate) the response information, and can provide feedback information relating to the response to the query to the document manager component.

At 908, feedback information relating to the response to the query can be received from the device and/or the user. At 910, the response information of the query response, the VI score associated with the response, the feedback information, all or part of the group of respective versions of respective electronic documents, and/or other information can be analyzed. The document manager component can receive the feedback information from the device and/or user. The document manager component, employing the update component, can analyze the response information, the VI score associated with the response, the feedback information, all or part of the group of respective versions of respective electronic documents, and/or other information.

At 912, based at least in part on the results of the analysis of the response information, the VI score, the feedback information, all or part of the group of respective versions of respective electronic documents, and/or other information, an update relating to a query(ies), VI score(s), and/or version(s) of an electronic document(s) can be determined. At 914, the update relating to the query(ies), VI score(s), and/or version(s) of the electronic document(s) can be performed. The update component can determine the update relating to the query(ies), VI score(s), and/or version(s) of the electronic document(s) based at least in part on the results of the analysis of the response information, the VI score, the feedback information, all or part of the group of respective versions of respective electronic documents, and/or other information. The update component can perform the update relating to the query(ies), VI score(s), and/or version (s) of the electronic document(s). For instance, the update component can determine that, to enhance (e.g., improve) responses to the query or a similar query in the future, a partial version, a summary version, or a full version of an electronic document can be modified; a VI score associated with the partial version, summary version, or full version of the electronic document (or the modified partial version, summary version, or full version of the electronic document) can be modified; a new partial version, a summary version, or a full version of an electronic document can be generated; a new VI score associated with the new partial version, summary version, or full version of the electronic document can be generated; an initial (e.g., pre-created) query can be modified; a new query can be generated; and/or another type of update relating to the query(ies), VI score(s), and/or version(s) of the electronic document(s) can be performed. The update component can store information regarding or relating to the modified or new partial version, summary version, or full version of the electronic document, the modified or new IV score, the modified initial query, the new query, and/or other update can be stored in the data store.

Figure 10:
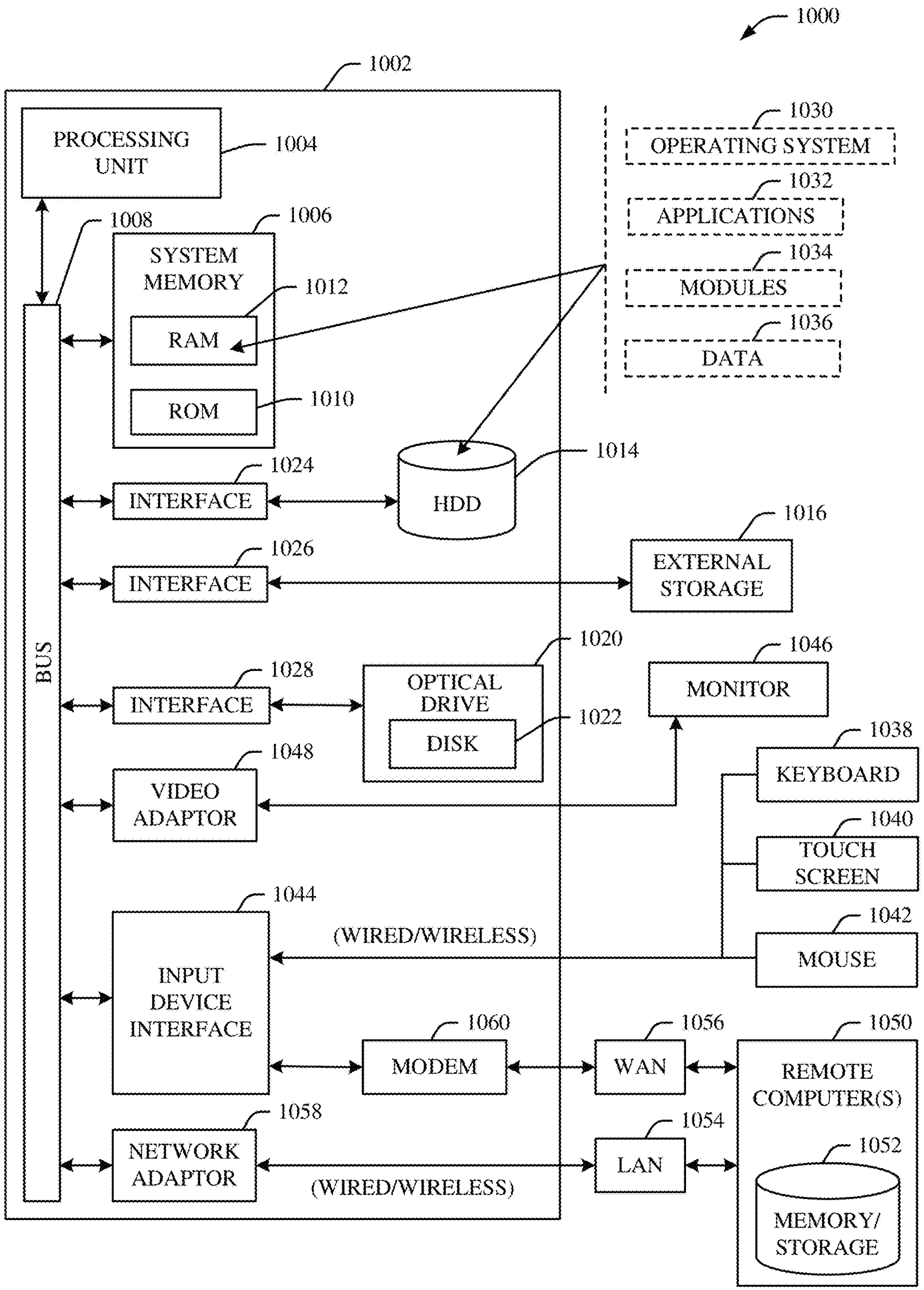
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 also can be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), IoT device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., document manager component, device, model, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

with regard to a group of respective versions of respective electronic documents, determining, by a system comprising at least one processor, respective value information scores associated with the respective versions of respective electronic documents based on a result of a first analysis of the respective versions of respective electronic documents, wherein the group of respective versions of respective electronic documents comprises respective first versions of respective electronic documents and respective second versions of respective electronic documents that are variations of the respective first versions of respective electronic documents; and in connection with a query, and from the group of respective versions of respective electronic documents, determining, by the system, a subgroup of respective versions of respective electronic documents to input to an artificial intelligence-based model for a second analysis based on a threshold token size associated with the artificial intelligence-based model and the respective value information scores and respective token sizes associated with the respective versions of respective electronic documents, wherein the subgroup of respective versions of respective electronic documents is input into the artificial intelligence-based model for the second analysis to facilitate determining a response to the query, wherein the threshold token size indicates a total token size of tokens that are able to be input to the artificial intelligence-based model in connection with the query, wherein the group of respective versions of respective electronic documents comprises the subgroup of respective versions of respective electronic documents and other respective subgroups of respective versions of respective electronic documents that are determined to have respective total token sizes that satisfy the threshold token size, and wherein the subgroup of respective versions of respective electronic documents has a total value information score that is higher than other respective total value information scores of the other respective subgroups of respective versions of respective electronic documents.

2. The method of claim 1, wherein the respective first versions of respective electronic documents are respective full versions of respective electronic documents, and wherein the respective second versions of respective electronic documents comprise respective partial versions of respective electronic documents and respective summary versions of respective electronic documents that are respective variations of, and correspond to, the respective full versions of respective electronic documents.

3. The method of claim 2, wherein the result is a first result, and wherein the method further comprises:

generating, by the system, the respective partial versions of respective electronic documents and the respective summary versions of respective electronic documents based on a second result of a third analysis of the respective full versions of respective electronic documents.

4. The method of claim 3, further comprising:

determining, by the system, respective initial queries, relating to the respective full versions of respective electronic documents, that have been determined to satisfy a defined threshold likelihood of being received by the system, wherein the generating of the respective partial versions of respective electronic documents and the respective summary versions of respective electronic documents comprises generating the respective partial versions of respective electronic documents and the respective summary versions of respective electronic documents based on the second result of the third analysis of the respective full versions of respective electronic documents or the respective initial queries, and wherein the determining of the respective value information scores comprises determining the respective value information scores associated with the respective full versions of respective electronic documents, the respective partial versions of respective electronic documents, and the respective summary versions of respective electronic documents based on respective contexts, respective intents, or respective keywords associated with the respective initial queries.

5. The method of claim 2, wherein the result is a first result, and wherein the method further comprises:

determining, by the system, respective first token sizes associated with the respective full versions of respective electronic documents, respective second token sizes associated with the respective partial versions of respective electronic documents, and respective third token sizes associated with the respective summary versions of respective electronic documents based on a second result of a third analysis of the respective full versions of respective electronic documents, the respective partial versions of respective electronic documents, and the respective summary versions of respective electronic documents.

6. The method of claim 2, wherein the threshold token size is a second threshold token size, wherein a first threshold token size is greater than the second threshold token size, wherein the subgroup of respective versions of respective electronic documents is a second subgroup of respective versions of respective electronic documents, and wherein the method further comprises:

determining, by the system, that the group of respective versions of respective electronic documents is potentially responsive to the query based on a determination of a context, an intent, or a group of keywords of the query, wherein the determining of the second subgroup of respective versions of respective electronic documents from the group of respective versions of respective electronic documents comprises: from the group of respective versions of respective electronic documents, determining respective first subgroups of respective versions of respective electronic documents that satisfy the first threshold token size and are associated with respective total value information scores that satisfy a defined value information score criterion based on the respective token sizes and the respective value information scores associated with the respective versions of respective electronic documents of the group of respective versions of respective electronic documents, wherein the respective first subgroups of respective versions of respective electronic documents comprise the second subgroup of respective versions of respective electronic documents and the other subgroups of respective versions of respective electronic documents, and wherein the respective first subgroups of respective versions of respective electronic documents comprise respective combinations of the respective full versions of respective electronic documents, the respective partial versions of respective electronic documents, or the respective summary versions of respective electronic documents.

7. The method of claim 6, wherein the respective first subgroups of respective versions of respective electronic documents are associated with the respective total value information scores that are determined based on the respective value information scores associated with the respective versions of respective electronic documents of the respective first subgroups, wherein the respective first subgroups of respective versions of respective electronic documents are associated with the respective total token sizes that are determined based on the respective token sizes associated with the respective versions of respective electronic documents of the respective first subgroups, and wherein the determining of the second subgroup of respective versions of respective electronic documents comprises: from the respective first subgroups of respective versions of respective electronic documents, determining the second subgroup of respective versions of respective electronic documents based on a combined token size of a token size associated with the query and the total token size associated with the second subgroup being determined to satisfy the second threshold token size, and based on the total value information score associated with the second subgroup being determined to be higher than the other respective total value information scores associated with the other respective first subgroups of respective versions of respective electronic documents.

8. The method of claim 1, wherein the respective value information scores comprise a value information score associated with a version of an electronic document of the respective versions of the respective electronic documents, and wherein the method further comprises:

determining, by the system, the value information score associated with the version of the electronic document based on a similarity evaluation score associated with the version of the electronic document, a first score weight associated with the similarity evaluation score, a semantic score associated with the version of the electronic document, and a second score weight associated with the semantic score, wherein the similarity evaluation score relates to a textual similarity between the version of the electronic document and a reference electronic document.

9. The method of claim 8, wherein the similarity evaluation score is a recall-oriented understudy for gisting evaluation score, a bidirectional-encoder-representations-from-transformers score, or a metric-for-evaluation-of-translation-with-explicit-ordering score.

10. The method of claim 1, further comprising:

inputting, by the system, the subgroup of respective versions of respective electronic documents into the artificial intelligence-based model for the second analysis of the subgroup of respective versions of respective electronic documents using the artificial intelligence-based model; and presenting, by the system, the response to the query to a device or a user, wherein the response to the query is determined based on the second analysis of the subgroup of respective versions of respective electronic documents using the artificial intelligence-based model.

11. The method of claim 10, wherein the query is a first query, wherein the respective versions of respective electronic documents comprise a version of an electronic document, wherein the version of the electronic document is a full version of the electronic document, a first partial version of the electronic document, or a first summary version of the electronic document, and wherein the method further comprises:

receiving, by the system, feedback information, relating to the response to the query, from the device or the user; and based on the feedback information, at least one of:

generating, by the system, a second query relating to at least some of the respective versions of respective electronic documents;

modifying, by the system, an initial query relating to at least some of the respective versions of respective electronic documents, wherein the initial query had been generated by the system;

modifying, by the system, a value information score associated with the version of the respective electronic document;

modifying, by the system, the partial version of the electronic document or the summary version of the electronic document; or from the full version of the electronic document, generating, by the system, a second partial version of the electronic document or a second summary version of the electronic document.

12. A system, comprising:

at least one memory that stores computer executable components; and at least one processor that executes computer executable components stored in the at least one memory, wherein the computer executable components comprise:

a value information determinator that, with regard to a group of respective forms of respective electronic documents, determines respective value information scores associated with the respective forms of respective electronic documents based on a result of a first analysis of the respective forms of respective electronic documents, wherein the group of respective forms of respective electronic documents comprises respective first forms of respective electronic documents and respective second forms of respective electronic documents that are derived from the respective first forms of respective electronic documents; and a document selector, wherein, in response to receiving a query, and from the group of respective forms of respective electronic documents, the document selector determines a portion of the respective forms of respective electronic documents to input to an artificial intelligence-based model for a second analysis based on a threshold token size associated with the artificial intelligence-based model and the respective value information scores and respective token sizes associated with the respective forms of respective electronic documents, wherein the portion of the respective forms of respective electronic documents is input into the artificial intelligence-based model for the second analysis to facilitate a determination of a response to the query, wherein the threshold token size indicates an overall token size of tokens that are able to be input to the artificial intelligence-based model with respect to the query, wherein the group of respective forms of respective electronic documents comprises the portion of respective forms of respective electronic documents and other respective portions of respective forms of respective electronic documents that are determined to have respective overall token sizes that satisfy the threshold token size, and wherein the portion of respective forms of respective electronic documents has an overall value information score that is determined to be greater than other respective overall value information scores of the other respective portions of respective versions of respective electronic documents.

13. The system of claim 12, wherein the respective first forms of respective electronic documents are respective full forms of respective electronic documents, and wherein the respective second forms of respective electronic documents comprise respective partial forms of respective electronic documents or respective summary forms of respective electronic documents that are derived from and correspond to the respective full forms of respective electronic documents.

14. The system of claim 13, wherein the result is a first result, and wherein the computer executable components further comprise:

a document processor that determines and generates the respective partial forms of respective electronic documents or the respective summary forms of respective electronic documents based on a second result of a third analysis of the respective full forms of respective electronic documents.

15. The system of claim 14, wherein the computer executable components further comprise:

a query generator that determines respective initial queries, relating to the respective full forms of respective electronic documents, that at least satisfy a defined likelihood of being received by the system, wherein the document processor generates the respective partial forms of respective electronic documents or the respective summary forms of respective electronic documents based on the second result of the third analysis of the respective full forms of respective electronic documents or the respective initial queries, and wherein the value information determinator determines the respective value information scores associated with the respective full forms of respective electronic documents, the respective partial forms of respective electronic documents, or the respective summary forms of respective electronic documents based on respective contexts, respective intents, or respective keywords associated with the respective initial queries.

16. The system of claim 13, wherein the result is a first result, and wherein the computer executable components further comprise:

a token size determinator that determines respective first token sizes associated with the respective full forms of respective electronic documents, respective second token sizes associated with the respective partial forms of respective electronic documents, or respective third token sizes associated with the respective summary forms of respective electronic documents based on a second result of a third analysis of the respective full forms of respective electronic documents, the respective partial forms of respective electronic documents, or the respective summary forms of respective electronic documents.

17. The system of claim 13, wherein the threshold token size is a second threshold token size, wherein a first threshold token size is larger than the second threshold token size, wherein the portion of respective forms of respective electronic documents is a second portion of respective forms of respective electronic documents, wherein the document selector determines that the group of respective forms of respective electronic documents is potentially responsive to the query based on a determination of a context, an intent, or a group of keywords of the query, wherein, from the group of respective forms of respective electronic documents, the document selector determines respective first portions of respective forms of respective electronic documents that satisfy the first threshold token size and are associated with the respective overall value information scores that satisfy a defined value information score criterion based on the respective token sizes and the respective value information scores associated with the respective forms of respective electronic documents of the group of respective forms of respective electronic documents, wherein the respective first portions of respective forms of respective electronic documents comprise the second portion of respective forms of respective electronic documents and the other portions of respective forms of respective electronic documents, and wherein the respective first portions of respective forms of respective electronic documents comprise respective combinations of the respective full forms of respective electronic documents, the respective partial forms of respective electronic documents, or the respective summary forms of respective electronic documents.

18. The system of claim 17, wherein the respective first portions of respective forms of respective electronic documents are associated with the respective overall value information scores that are determined based on the respective value information scores associated with the respective forms of respective electronic documents of the respective first portions, wherein the respective first portions of respective forms of respective electronic documents are associated with the respective overall token sizes that are determined based on the respective token sizes associated with the respective forms of respective electronic documents of the respective first subgroups, and wherein, from the respective first portions of respective forms of respective electronic documents, the document selector determines and selects the second s portion of respective forms of respective electronic documents based on a total of a token size associated with the query and the overall token size associated with the second portion being determined to satisfy the second threshold token size, and based on the overall value information score associated with the second s portion being determined to be greater than the other respective overall value information scores associated with the other respective first portions of respective forms of respective electronic documents.

19. A non-transitory machine-readable medium, comprising executable instructions that, when executed by at least one processor, facilitate performance of operations, comprising:

with regard to a group of respective versions of respective electronic documents, generating respective value scores associated with the respective versions of respective electronic documents of the group based on a result of a first analysis of the respective versions of respective electronic documents, wherein the group of respective versions of respective electronic documents comprises respective first versions of respective electronic documents and respective second versions of respective electronic documents that are derived based on the respective first versions of respective electronic documents; and in response to receiving a query, and from the group of respective versions of respective electronic documents, selecting a subgroup of respective versions of respective electronic documents for a second analysis using an artificial intelligence-based model based on a threshold token size associated with the artificial intelligence-based model and based on the respective value scores and respective token sizes associated with the respective versions of respective electronic documents, wherein the subgroup of respective versions of respective electronic documents is input into the artificial intelligence-based model for the second analysis to facilitate generation of a response to the query, wherein the threshold token size indicates a total token size of tokens that are able to be input to the artificial intelligence-based model with respect to the query, wherein the group of respective versions of respective electronic documents comprises the subgroup of respective versions of respective electronic documents and other respective subgroups of respective versions of respective electronic documents that are determined to have respective total token sizes that satisfy the threshold token size, and wherein the subgroup of respective versions of respective electronic documents has a total value score that is determined to be higher than other respective total value scores of the other respective subgroups of respective versions of respective electronic documents.

20. The non-transitory machine-readable medium of claim 19, wherein the result is a first result, and wherein the operations further comprise:

determining respective initial queries, relating to respective full versions of respective electronic documents, that potentially will be received; and generating respective partial versions of respective electronic documents or respective summary versions of respective electronic documents based on a second result of a third analysis of the respective full versions of respective electronic documents or the respective initial queries, wherein the respective first versions of respective electronic documents are the respective full versions of respective electronic documents, wherein the respective second versions of respective electronic documents comprise the respective partial versions of respective electronic documents or the respective summary versions of respective electronic documents, wherein the generating of the respective value scores comprises determining the respective value scores associated with the respective full versions of respective electronic documents, the respective partial versions of respective electronic documents, or the respective summary versions of respective electronic documents based on respective contexts, respective intents, or respective keywords associated with the respective initial queries, wherein the selecting comprises: from the respective full versions of respective electronic documents, the respective partial versions of respective electronic documents, or the respective summary versions of respective electronic documents, selecting the subgroup of respective versions of respective electronic documents for the second analysis using the artificial intelligence-based model based on the threshold token size, based on the respective value scores and the respective token sizes, and based on a token size associated with the query, wherein the subgroup of respective versions of respective electronic documents is determined to have the total value score that is determined to be higher than the other total value scores associated with the other subgroups of respective versions of respective electronic documents, and wherein a combined token size associated with the query and the subgroup of respective versions of respective electronic documents is determined to satisfy the threshold token size.

* * * * *